Feb. 2, 1960  M. PAPO  2,923,924
INFORMATION RECORDING CONTROL AND CHECK
Filed Dec. 23, 1957  15 Sheets-Sheet 1

INVENTOR
MAURICE PAPO
BY John P. Dority
ATTORNEY

FIG_3_

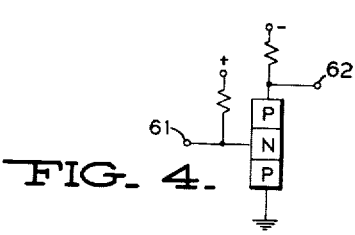
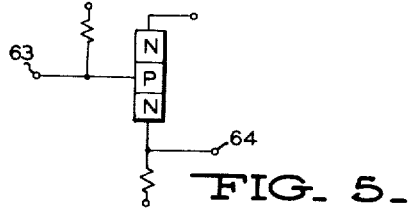
FIG. 4.    FIG. 5.
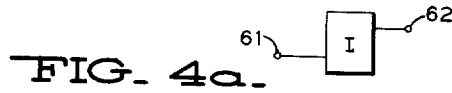
FIG. 4a.    FIG. 5a.
FIG. 6.
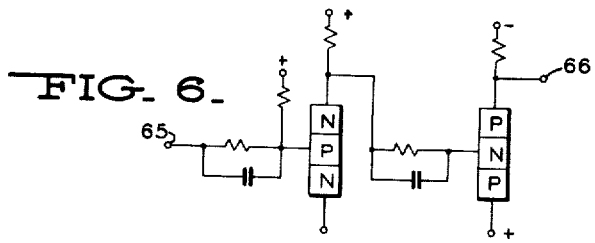
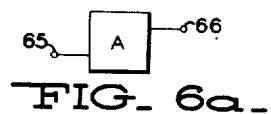
FIG. 6a.
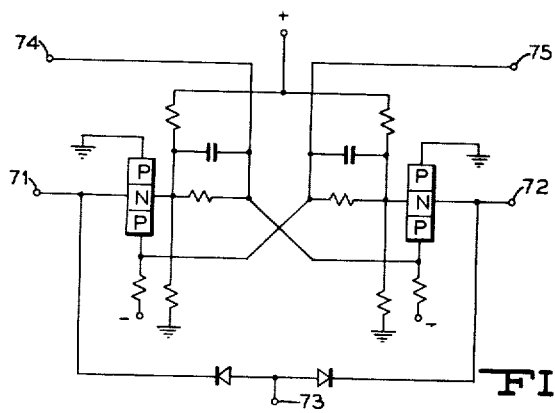
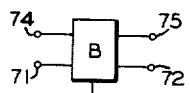
FIG. 7a.
FIG. 7.
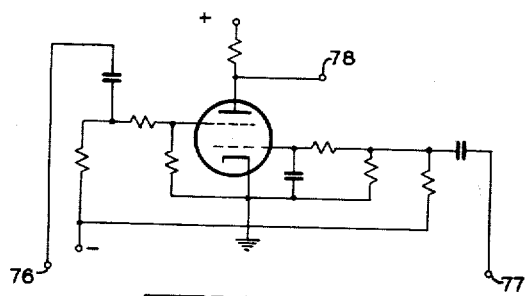
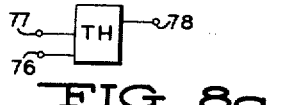
FIG. 8a.
FIG. 8.

Feb. 2, 1960 M. PAPO 2,923,924
INFORMATION RECORDING CONTROL AND CHECK
Filed Dec. 23, 1957 15 Sheets-Sheet 5
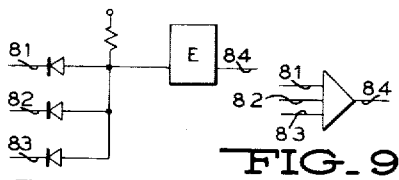
FIG_9_
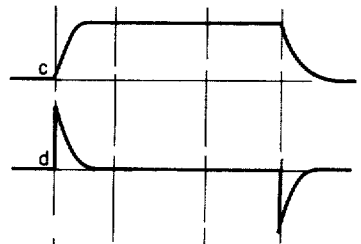
FIG_9a_
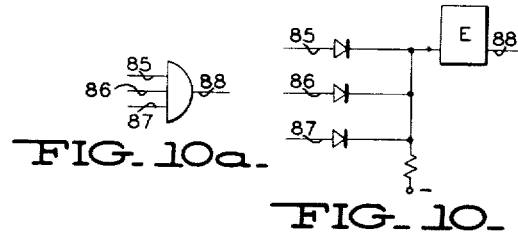
FIG_10a_   FIG_10_
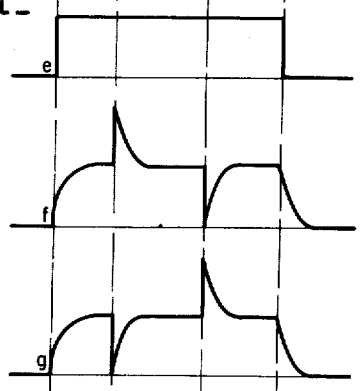
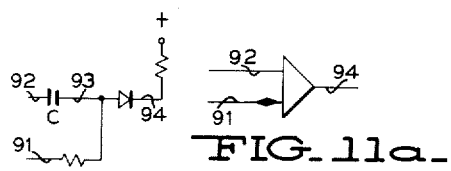
FIG_11_
FIG_11a_
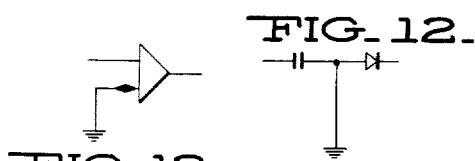
FIG_12_
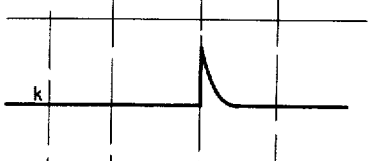
FIG_12a_
FIG_13_

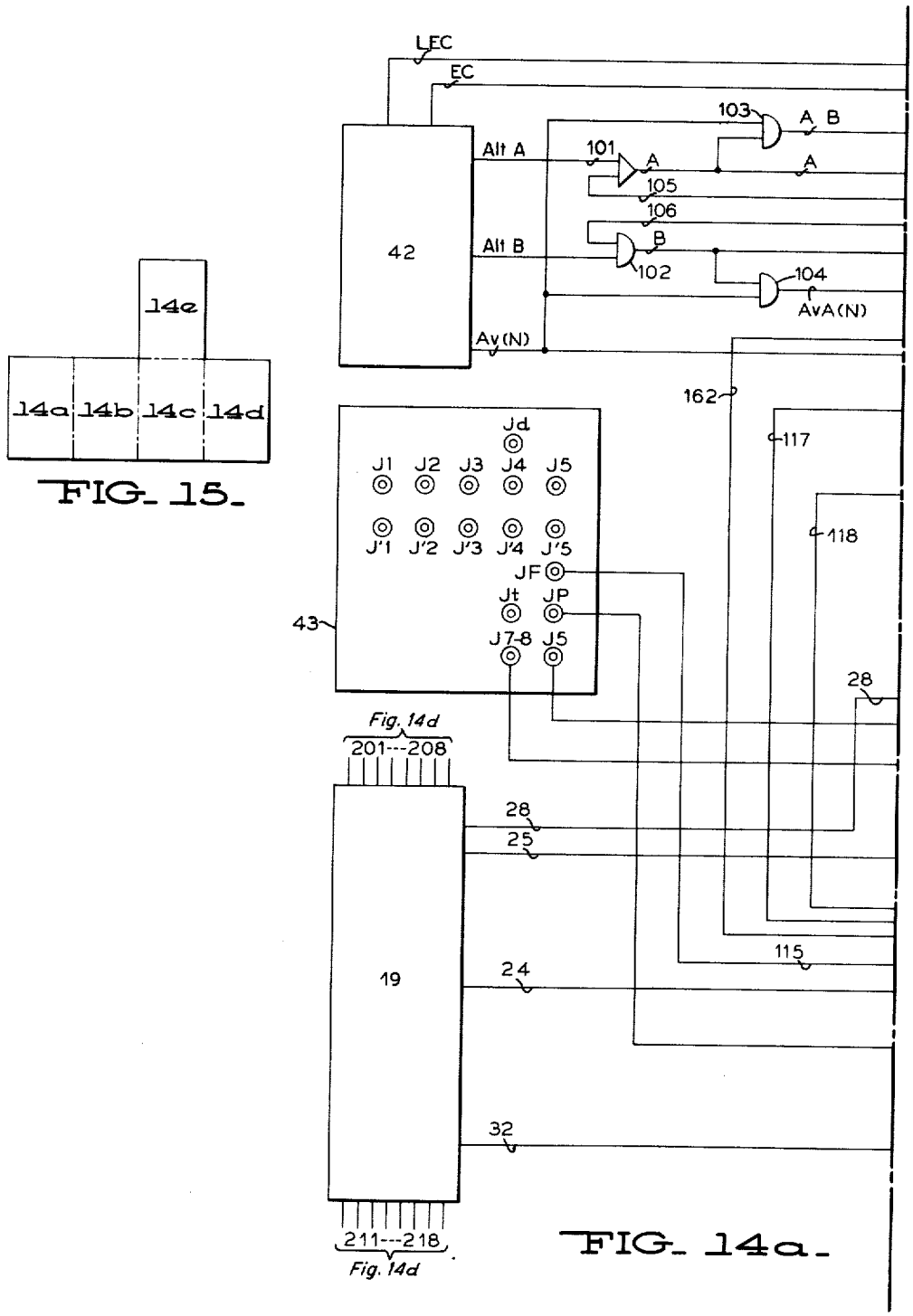

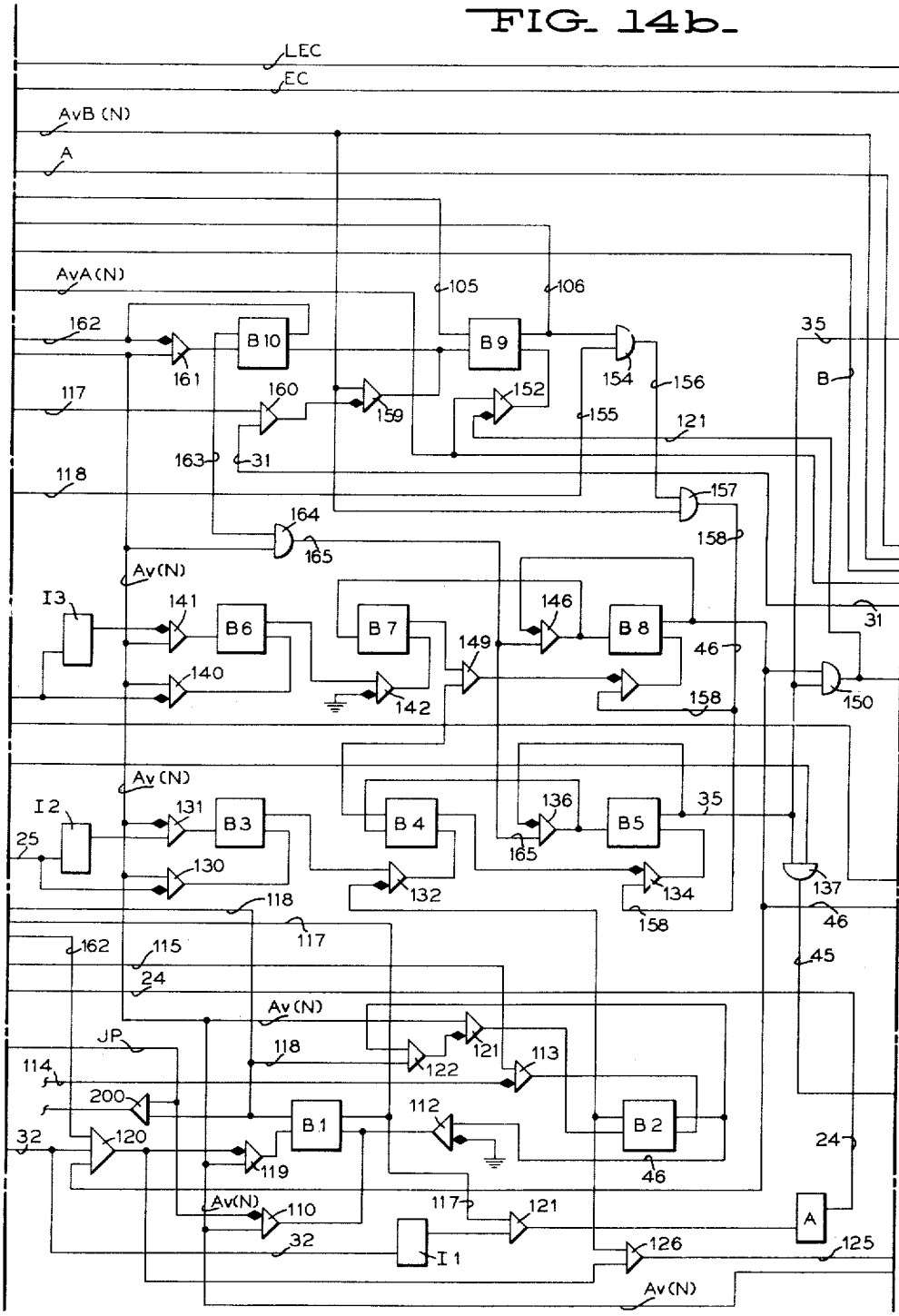

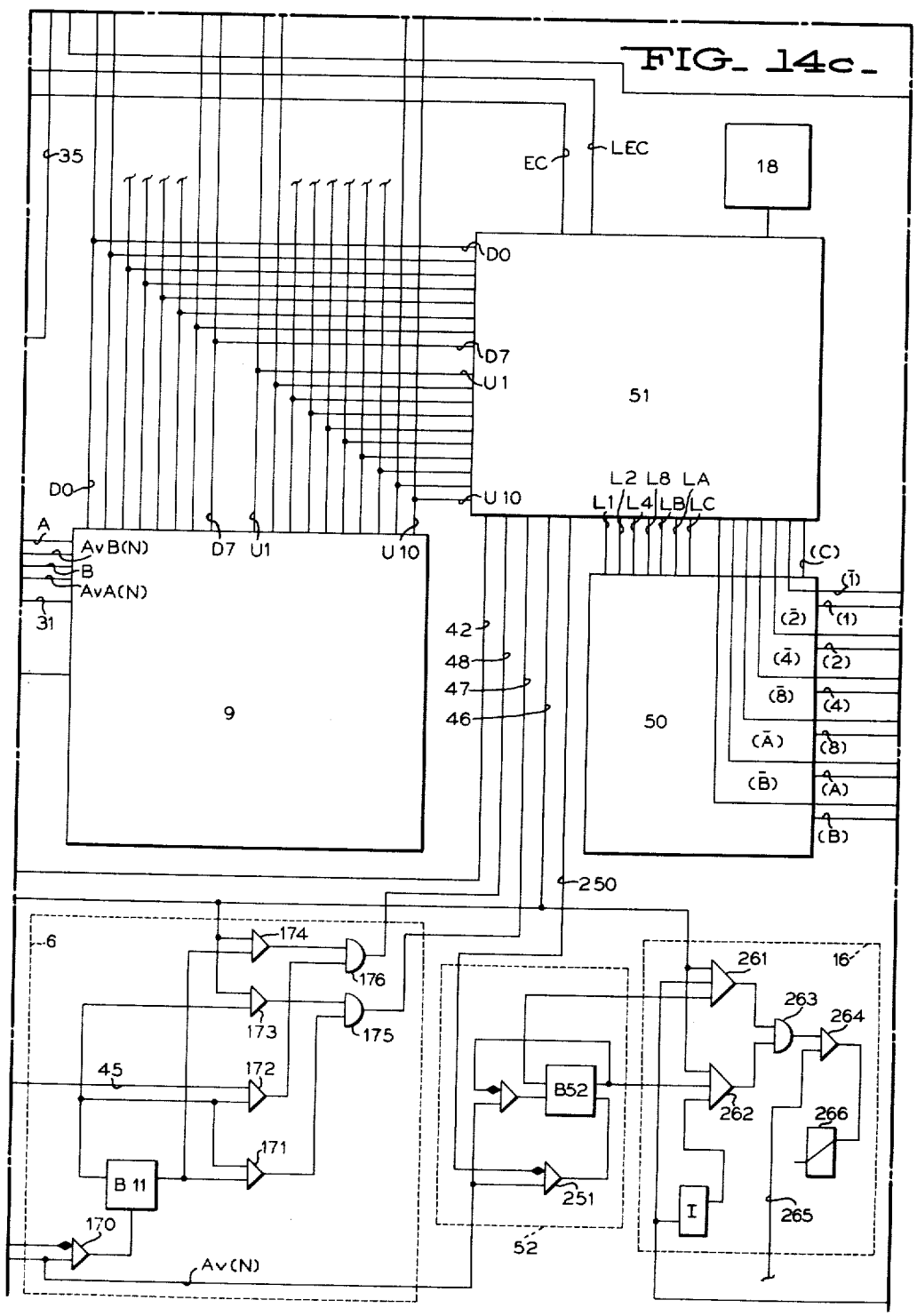

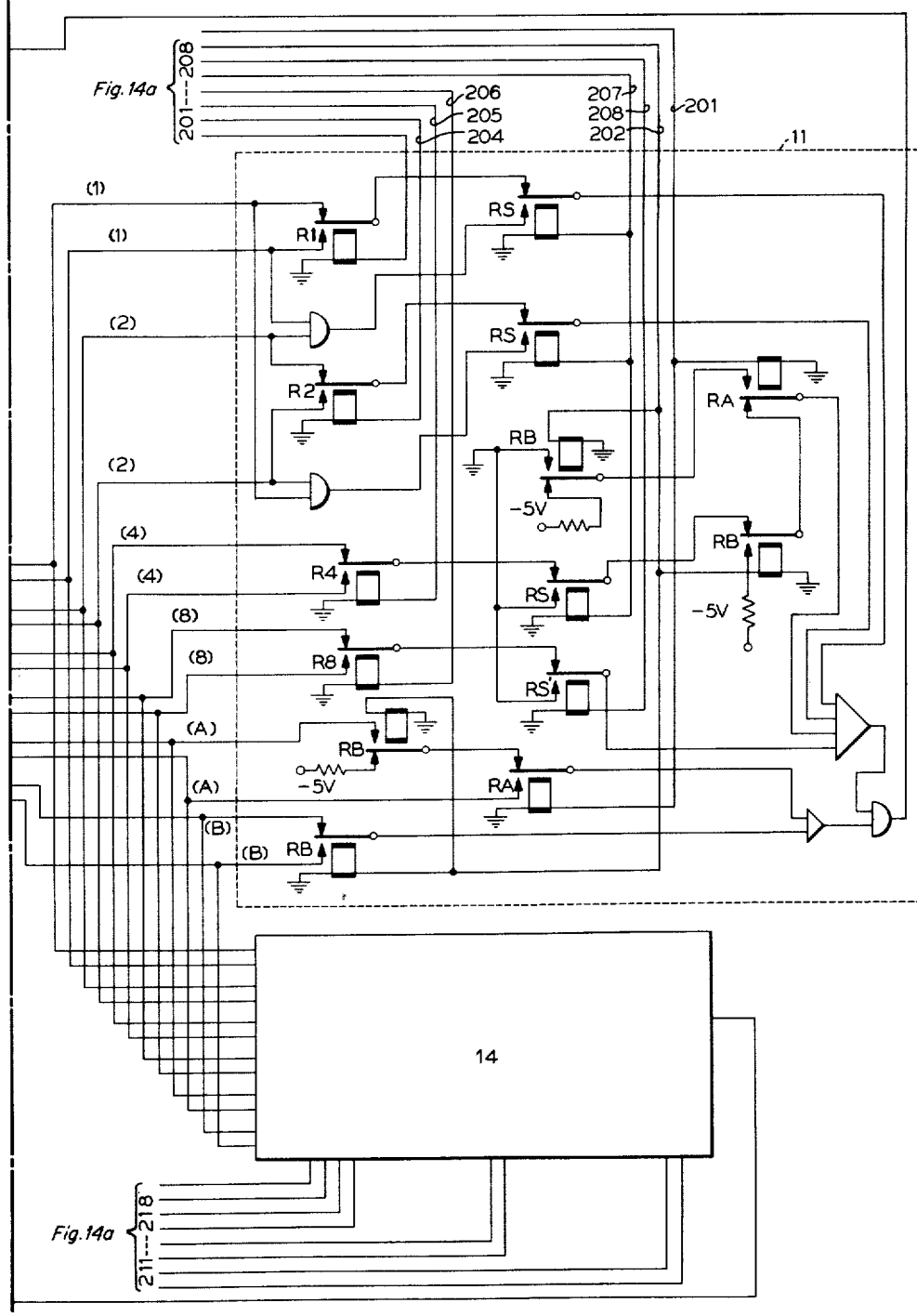

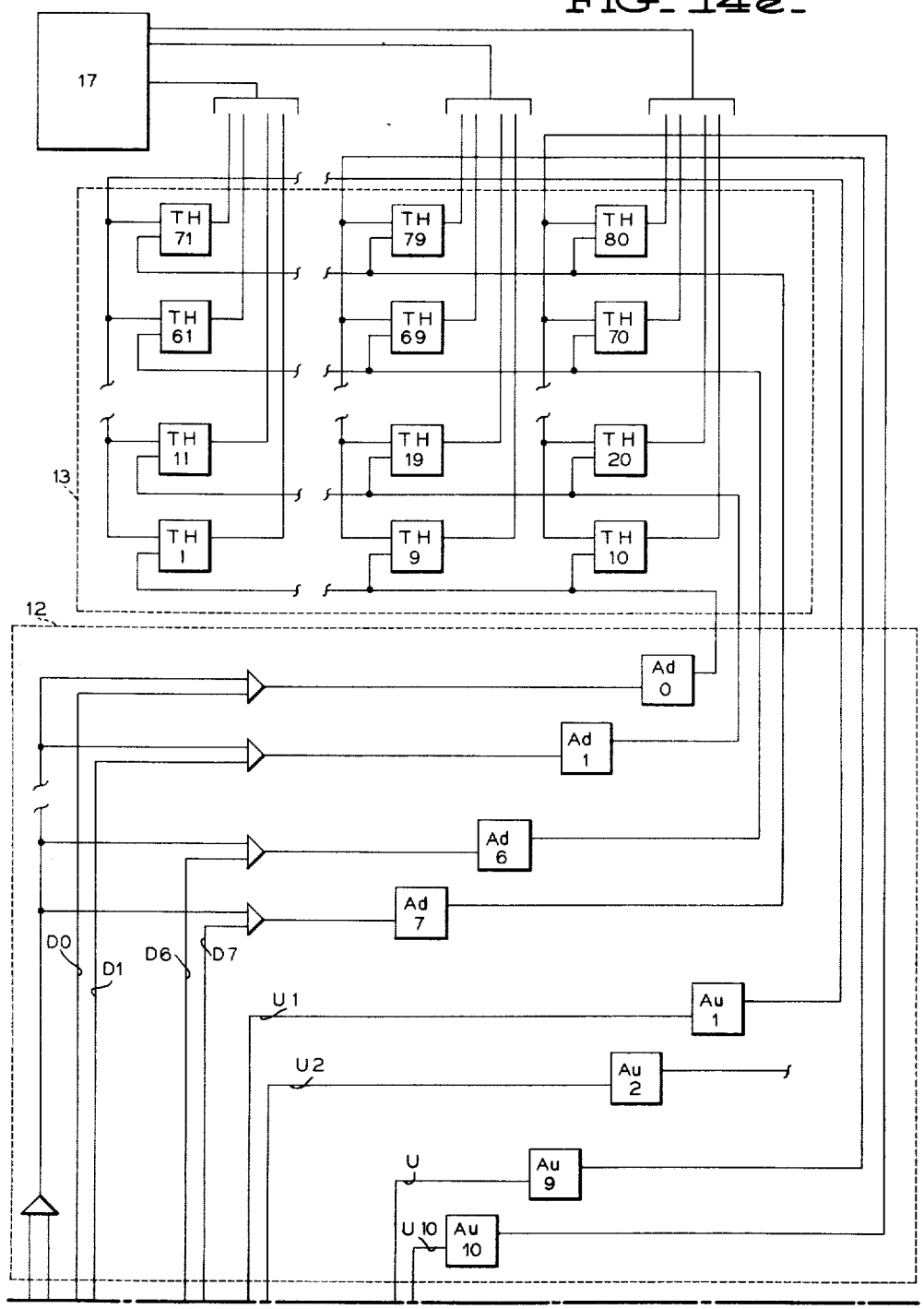

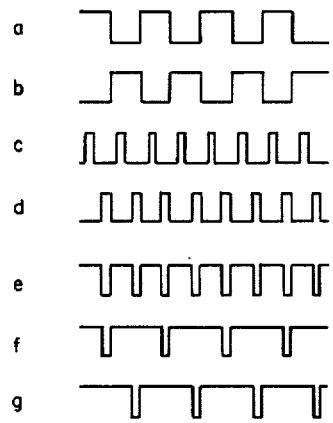
FIG_16_
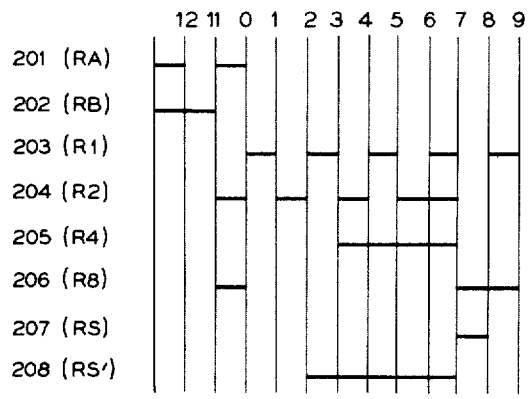
FIG_17_
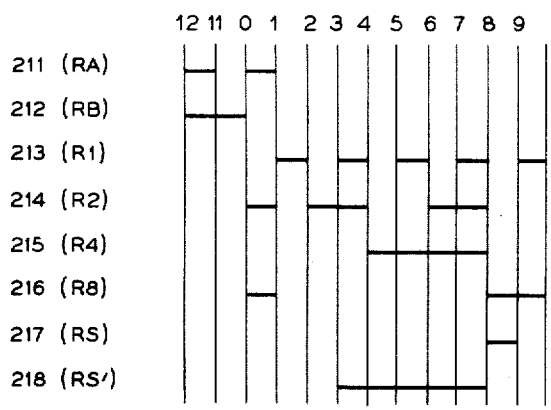
FIG_18_

United States Patent Office 2,923,924
Patented Feb. 2, 1960

2,923,924
INFORMATION RECORDING CONTROL AND CHECK

Maurice Papo, Paris, France, assignor to International Business Machines Corporation, New York, N.Y., a corporation of New York Application December 23, 1957, Serial No. 704,781

6 Claims. (Cl. 340—174)

This invention relates to machines for recording information and particularly, to devices for checking the recorded information.

The operation programs for machines processing data recorded on punched cards often provide the punching of additional cards for recording the calculation results. Said punching called "recapitulatory punching" is primarily effected by a punching machine connected to the main machine.

To detect possible errors, the punching accuracy is checked by reading the perforations punched by means of brushes and comparing the results of said reading with the data computed by the machine.

However, the heretofore used devices could only be utilized when the punch code was the same as the code for recording data or for manifesting results in the machine memories or counters. But, in many machines, and especially in most electronic machine memories use is made of codes different from that used for punching the cards, for the memory organs are costly and therefore their numbers are reduced to the minimum necessary for an accurate translation of the information whereas in the cards it is desirable to have a code with more redundancy but easier to deal with.

The same problem will be met when the record is made on other supports than cards, for example, on a continuous tape, punching being then replaced by other recording methods such as graphic, magnetic or optical marks.

A primary object of this invention is to provide an improved recording and checking device.

Data derived from an assembly, wherein a memory and a code change organ are associated, are transferred onto a permanent support such as a card or a tape, and that the result of said transfer is scanned by a read-organ which transmits the information detected on the permanent support to a comparing organ which, by co-acting either with the first memory code change organ assembly or with a second assembly comprising another memory and another (or the same) code change organ, makes it possible to compare the data recorded on the permanent support with those registered in the first memory-code change organ assembly.

It should be noted that the comparison could be performed in two ways:

(1) By decoding the signals sensed by the reading organ and comparing the result of said decoding with the untransformed signals from the memory.

(2) By coding again the signals from the memory and comparing the resulting signals with those detected by the reading organ.

The first method does not allow a total check. If, for instance, the memory code is a six bit code (permitting 64 combinations) which will be sufficient for representing the ten figures, 26 letters and a few special signs) whereas the record is translated by one or more perforations performed in a column of a 12 row card (which permits 1024 combinations, a few of which only are used) the presence of unwanted perforations will not be detected unless the system is provided with an unwanted combination detecting device, which makes the whole system more complex.

On the other hand, the second method allows a complete check, as a comparison is made of signals having a code identical to that used on the record support.

A further object of the invention is to provide an improved process for controlling and checking information recording.

In conventional devices, comparisons are made simultaneously in all the card columns used for the recapitulatory perforation, so that a comparison circuit is necessary for each column.

Another object of the invention is to provide an improved process for controlling and checking information recording using a minimum of structure. The bits, recorded simultaneously or not, are checked in turn by a single comparison organ; it is understood that this system may be employed when the code used in the recording memory is identical to that used on the recording support, as well as when the two codes are different.

According to the invention, the memory used for checking may be either the recording memory, or another memory wherein the results contained in the recording memory have been transferred; the latter arrangement makes the first memory available again, so that the machine program may be carried on without it being necessary to wait for the result of the vertification.

If the recording follows a computation, the machine may perform a check computation, preferentially according to a different process and send the results to the memory used for checking; it is thereby possible to check both the material accuracy of the record and the accuracy of the computing.

If the information contained in the memory where the recording was made is used for checking (that is when no checking computation is to be effected) and to avoid transfers from one memory to the other as well as an interruption of the program, one may utilize two memories alternately and record from one while checking in the other accuracy of the preceding record; every checking is followed with a switching of the two memories, the check memory receiving the results of new computations, and the other being ready for checking.

Another object of the invention is to provide an improved apparatus for controlling and checking information recording wherein no delays are occasioned thereby.

A further object of this invention is to provide improved apparatus for checking both the accuracy of a computation or logical operation and the accuracy of the recording.

Two memories are provided, one receiving the results of the computation or of the logical operation in order to supply them to a record support, while the other receives the results of another computation or of another logical operation possibly performed according to a different mode but with the same results.

Another object of the invention is to provide an improved device for controlling and checking data recording wherein the checking of a record is performed simultaneously with the recording of new results.

Another object is to provide improved apparatus for recording data from a data processing machine on a record wherein a check of the accuracy of the recording may be had without delaying the operation of the data processing machine.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 4 through 12 show the symbolic and detailed form of component circuits used in Figs. 14a through 14d.

Fig. 13 shows diagrammatic waveforms that may appear in the circuit of Fig. 11.

Figs. 14a to 14e show a detailed block diagram of a device according to the present invention.

Figs. 16, 17, 18, 21, 22 and 23 are time charts illustrating the operation of the device of Figs. 14a through 14e.

Figure 1:
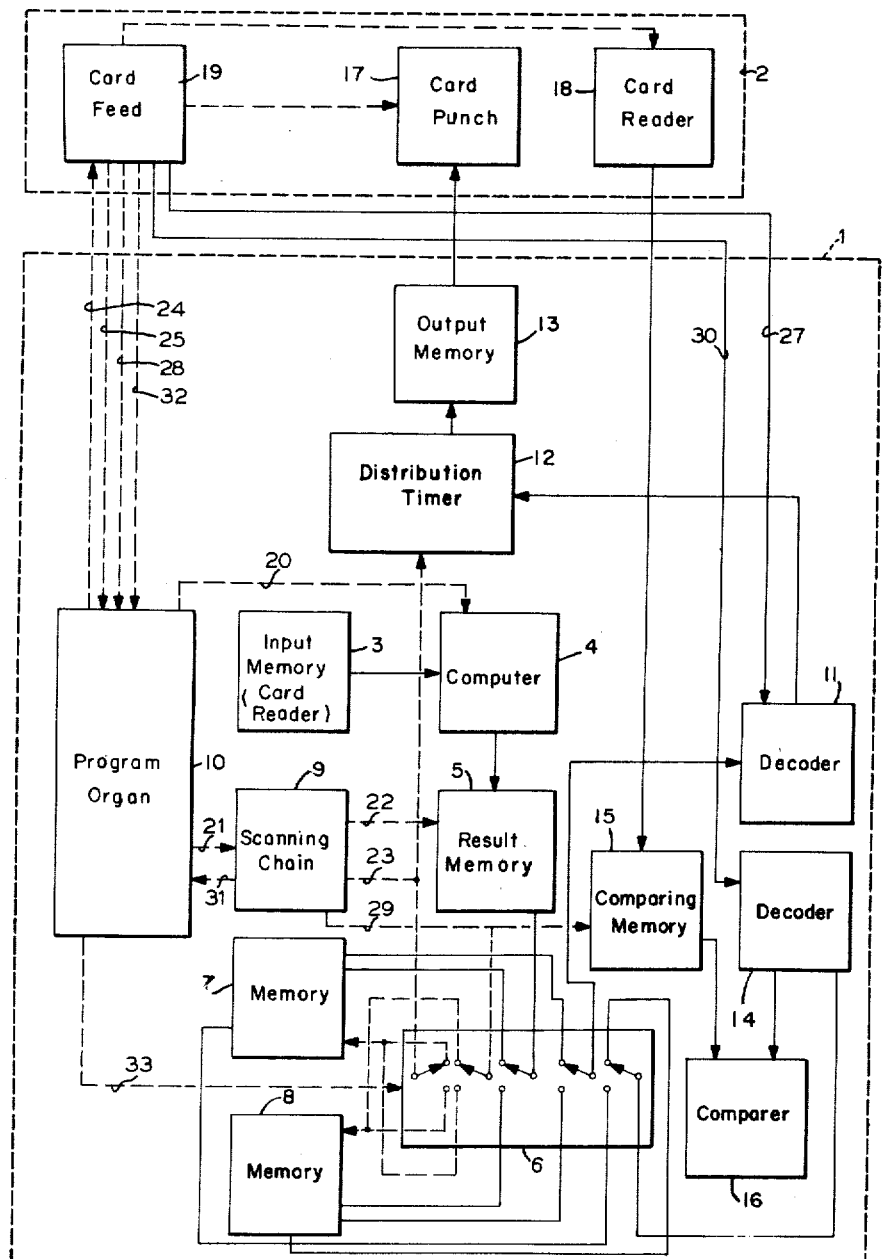
Fig. 1 shows in block diagram form a device constructed according to the present invention.
Figure 2:
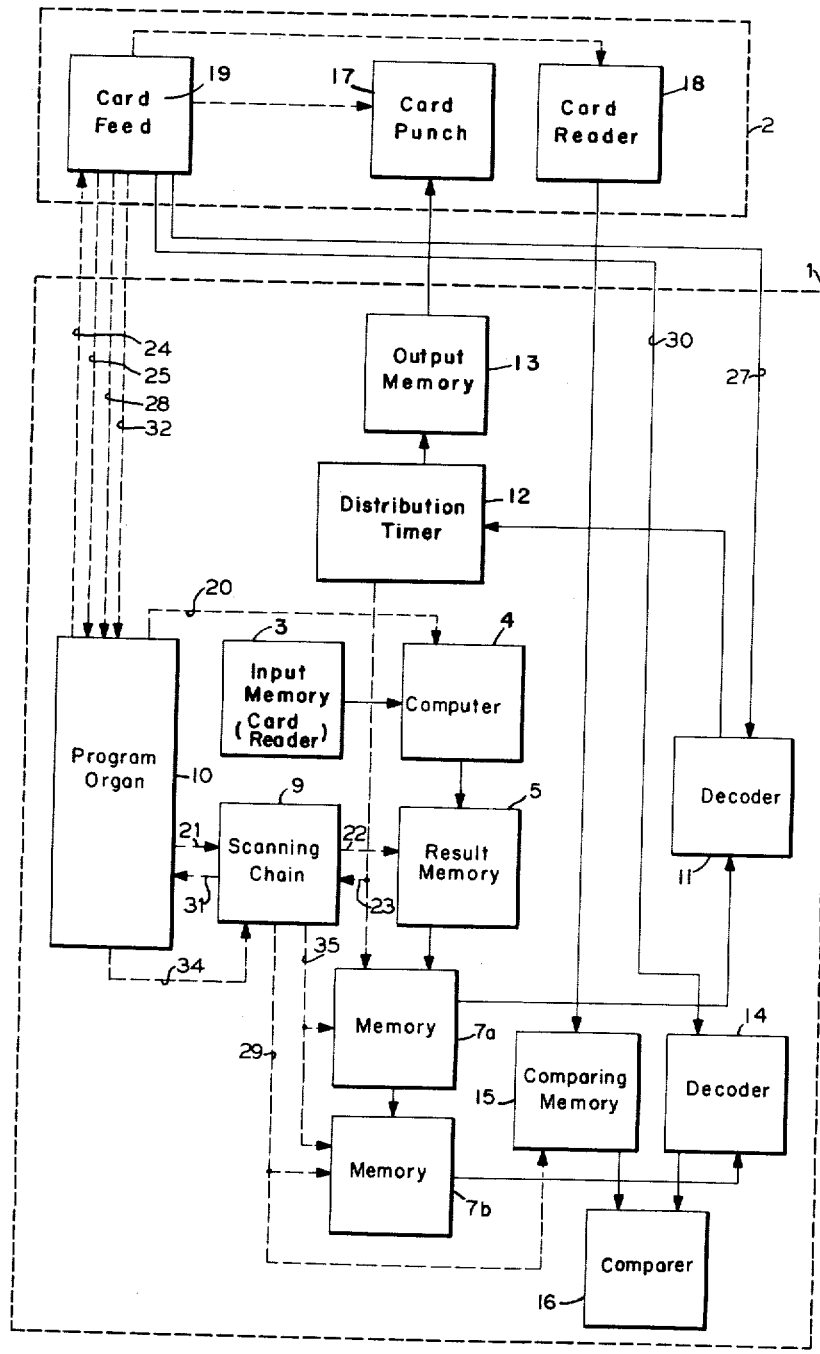
Fig. 2 shows the block diagram of a similar device, but with two cascaded memories instead of two alternate memories.

For a better understanding, there will be described successively:

(1) The general arrangement and operation of a device according to Figs. 1 and 2.
(2) The general arrangement and operation of a device in accordance with Fig. 3.
(3) The component circuits.
(4) The whole device shown in Figs. 14a through 14e.
(5) The operation of the device.

I. DEVICE WITH DIRECT CONNECTIONS

(a) Two memories used alternately

In Fig. 1, block 1 represents the machine for giving the results (and which will be referred to as the main machine) and block 2 represents a machine for effecting permanent recordings, for example, a punching machine (referred to as the connected machine). It is well understood that both these machines may be associated in one frame. Within each block, smaller blocks represent the organs coacting in the computing recording and checking operations, namely:

1. In the main machine 1:

An input memory 3 wherein there are recorded the card data (this memory may be constituted with the cards, if the data recorded therein are directly transferred to the computing organ).

A computing organ 4.

A result memory 5; said memory may be the same as the input memory, or else be a part of the computing organ.

A switch 6 (normally electronic); in the drawing, said switch is shown as an electric switch, but it is obvious that the connections or absence of material connections between the various circuits may be replaced by devices for gating the pulses, such as coincidence circuits or locking amplifiers.

Two memories 7 and 8 whereto the data or results to be recorded on the permanent support are transferred; both these memories are switchable as explained herebefore.

A scanning chain 9 which controls the transfer advance during the various machine operations.

A program organ 10 for synchronizing the operations of the other organs.

The organs controlling the permanent recording and transferring to the connected machine the data registered in the output memories; these organs are as follows, a decoder 11 which receives data from memory 7 or memory 8 according to the position of switch 6 and transforms then into output pulses, the times of which are determined by the synchronizing pulses from the connected machine; a timer 12 which distributes said pulses to the various locations of the output memory 13; and an output memory 13 which comprises a number of locations having two stable states (one being called "on" state and the other "off" state), for example, if the connected machine is a punching machine each location in memory 13 corresponds to a magnet controlling the interposer of one of the punches; if the connected machine performs magnetic recordings each location in memory 13 may be connected to one input of an AND circuit, the output of which feeds one recording head.

The recording and checking organs, which are as follows: a decoder 14, similar to decoder 11, but receiving information from memory 8 when decoder 11 receives information from memory 7, and conversely; a comparing memory 15 receiving data from the read part of the connected machine and a comparing device 16. Memory 15, as memory 13, comprises as many locations as there are recording organs.

2. In the connected machine 2:

The assembly of the recording organs and their control means 17 (in a punching machine, the assembly 17 would be composed of the various punches and associated interposers).

A reading device 18 (in a punching machine, the assembly 18 would be constituted by a brush row).

A feeding and timing device 19.

The connections between the various organs have been represented in full lines if they are provided for the transfer of data or results, and in dotted lines if they are control or timing connections. Said connections may be composed of one or more circuits. Throughout the description, the signals transmitted by these circuits will be designated by the same references as the circuits themselves.

The operation of the system will now be described from the moment when the first recording has been performed (for example, when a first recapitulatory card has just been punched).

In the following description it will be supposed, to make it easier to understand, that the recording is done by punching recapitulatory cards, but the operation of any other recording system would be similar.

It will also be assumed that:

The first recapitulatory card is punched in accordance with data contained in memory 8.

The switch is in the position shown in Fig. 1, i.e., the result memory 5 is able to transfer the information to the punching memory 7, the latter being able to transfer the information contained therein to the perforation decoder 11 while the punching memory 8 is able to transfer its own information to the checking decoder 13 (switch 6 has been placed in this position by a signal derived from the punching machine at the end of the perforation of the first recapitulatory card).

DATA ELABORATION AND FILLING OF THE PUNCHING MEMORY

The program, the processing of which had been interrupted during the perforation of the first recapitulatory card, is carried on again.

The main machine is fed by its hopper (not shown). The data from the cards are recorded in the input memory 3 and transmitted to the computing organ 4 which works under the control of the program organ 10 (said control being symbolically represented by line 20). The results are transferred to memory 5.

When, due either to the normal process of the program or to an order received by the program organ from another organ (for example, a comparison device not shown in the figure) it is necessary to record results which are to be reproduced further on in a punched card, the program organ 10 provides the scanning chain 9 with a signal which causes the scanning of the locations in memory 5 containing the information to be transferred (the control line is represented by line 21 and the scanning line by line 22). The places of these locations and the order according to which they are scanned are determined either by the connections established when the machine started, or the transfer order itself. The data are transferred from memory 5 to memory 7 which is presently connected to memory 5 through switch 6; the scanning of this memory is symbolically represented by line 23. It is supposed that this transfer automatically erases the information registered in memory 7 before said transfer; were it not so, a previous clearing of memory 7 would be provided in the program.

PUNCHING AND CHECKING

A further program stage is the perforation and check effected in the following steps:

(1) A signal from the main machine (represented by line 24) controls the advance of a card in the punching machine and its process before the punching machine read brushes; the passages of one row of the card to be punched under the punches and of the corresponding row of the card to be checked under the brush row will be supposed simultaneous in the course of the description, for clearness sake, though this condition is not necessary to the proper operation of the presently described system.

(2) Before a card row is punched, synchronizing signals derived from the punching machine and represented by line 25 control the synchronous scanning of timer 12 and memory 7 or 8 which is presently registering the information to be sent to the punching machine, that is, as was seen, memory 7; therefore, the scanning pulses are directed towards the interested memory through switch 6. The scanning pulse regulating the information read out in the successive locations of memory 7 is symbolically represented by line 23 as was the scanning pulse which had regulated the information recording into that memory.

At the same time as signals 25, the punching machine issues signals 27 which control the relays in decoder 11 and condition the contacts of this relay so that the signals from memory 7 cause a pulse to appear at the output of decoder 11 whenever these signals indicate the number corresponding to the card row which is to be fed under the punches of the punching machine, and in that very case only. For instance, if the next row to be punched is the 3 line, decoder 11 will deliver a pulse whenever a location of memory 7 containing the information "3" is scanned. The pulses from decoder 11 are sent to the timer 12 which also receives, as was seen, the scanning pulses synchronous to those scanning memory 7.

Thus, the timer 12 will put "on" the locations of output memory 13 which correspond to the columns of memory 7 storing the information "3."

The corresponding punch controls will be in a receptive state. Further on, a control internal to the punching machine causes the so selected punches to be lowered and the card to be punched in the corresponding columns. At the same time, the corresponding row of the card which goes past the read brushes will be read and the locations of memory 15, corresponding to punched columns in that line, are brought "on."'

(3) Synchronizing signals also delivered by the punching machine, and symbolically represented by line 28, control the synchronous scanning of memory 15 and of memories 7 and 8 after the card row is read; therefore, scanning pulses are directed towards the interested memory through switch 6 (said scanning being symbolically represented by line 29).

At the same time as signals 28, the punching machine delivers signals 30 controlling a number of relays in decoder 14 and conditioning the contacts of these relays so that signals from memory 8 cause a pulse to appear at the decoder output if these signals manifest the number corresponding to the card row which has just been sensed by the checking brushes, and in that very case only; if, for example, the two line has just passed under the checking brushes, decoder 14 will deliver a pulse when the scanning is in a position of memory 8 storing a "2." The pulses from decoder 14 will be sent to the comparing device 16 which also receives pulses from memory 15 scanned concurrently with memory 8, as explained herebefore. The comparing device produces an error signal when it receives a pulse from decoder 14 without simultaneously receiving one from memory 15, or when it receives a pulse from memory 15 without receiving one from decoder 14.

TIME RELATION BETWEEN PULSES 25, 27, 28 AND 30

Pulses 25 and 27 cooperate in controlling the perforation, the first one controlling the scanning of memory 7 and the second one the relays of decoder 11. It is obvious that the effect of these relays has to be set up before the scanning is initiated. Because of the mechanical relay inertia, pulse 27 has to be prior in time to pulse 25, and of sufficient duration for its effect to be felt as far as the end of the scanning.

For the same reasons, pulse 30 must be prior to pulse 28 and of sufficient duration for its effect to be felt as far as the end of the scanning of memory 8.

On the other hand, the scannings of the two memories may be simultaneous (if the circuitry permits it) or successive. Later, it will be assumed that these scannings are successive, which require pulses 25 and 28 to be distinct; here, it is assumed that pulses 27 and 30 are coincident. The following operations between the feeding of the "2" and "3" card lines under the punches or read brushes (the cards being assumed to advance according to an increasing order) will be as follows:

Positioning of relays in decoders 11 and 14 (pulses 27–30).

Recording of the "3" line into memory 13, in view of its perforation.

Checking then of line "2" (pulse 28).

In the above description, it was assumed that a data registered in a memory position was represented on the cards by a single perforation, but it is obvious that the same process may be used when a data is represented by several perforations. Decoder 11 (or 14) has but to deliver a pulse whenever a perforation of the line presently being punched (or of the line just read) corresponds in the card code to the data recorded in the presently scanned position of memory 7 (or 8).

PROCEEDING FROM ONE SCANNING OPERATION TO THE NEXT

When the chains 9 have ended with the scanning of a memory, they provide the program organ with a signal (symbolically represented by line 31) which makes it possible to perform the next scanning. Though devices may be realized wherein such signal would not be necessary (the time succession of the synchronizing signals derived from the punching machine being such as to prevent any unwanted interinfluence) it will be assumed hereafter that this signal does exist, due specifically to safety reasons.

END OF A CARD FEEDING

When both cards have finished passing one under the perforation punched and the other under the read brushes, the punching machine sends to the program organ of the main machine, a signal which causes the program to be carried on (going on with the computing or feeding a new card). Urged by this signal (represented by line 32) the program organ 10 will send switch 6 another signal represented as line 33 which triggers said switch, so as to connect the result memory 5 with the punching memory 8 and the latter to decoder 11 (for the punching of the next recapitulatory card), and to connect the perforation memory 7 to decoder 12 (for checking the just punched card).

The content of memory 8 may be transferred completely or partially to another memory for further operations; for example, it may be contemplated to store the partial totals computed for the successive recapitulatory cards, and to compare the result of that storing operation with a final total directly computed from the initial data.

SPECIAL CASES: THE FIRST AND LAST CARDS

What was described hereabove is the punching operation of the second recapitulatory card concurrently with the checking of the first recapitulatory card; the following punch and check operations will be effected in the same way. However, the punching of the first recapitulatory card and the checking of the last one will require special devices.

As concerns the first card, there is no card past the read brushes during the punching operation; thus, the comparing device ought to indicate an error. To avoid this, the comparing device 15 has to be made ineffective whenever there is no card under the read brushes and the punching machine. Such a result may be obtained by providing the read device with a card lever which, if there is no read card, produces such a pulse as locks the comparing device 16 output.

When the last card has been punched, the normal program processing does not comprise any more card advance in the punching machine; therefore, for the last card to pass under the read brushes, it is necessary to control the punching machine feeding by means of a special signal, said signal may be produced for instance by a card lever controlled by the hopper of the main machine when it is cleared.

USE OF RECORDING SUPPORTS OTHER THAN PUNCHED CARDS

Throughout the preceding description, it was supposed that the recording was made by means of recapitulatory card punching, but the operation of any other line by line recording system would be similar, as was remarked.

The following remarks are to be made concerning this question:

(1) If the record length on the support is short enough, it is possible to record successively rather than simultaneously the recording of the signs corresponding to the various columns; if so, the output memory 13 may be suppressed and the timer 12 be related directly to the recording organs 17; such an arrangement could be adopted, for example, for recording results on a magnetic tape.

(2) If the reading length is short enough, it is possible to read successively the signs corresponding to the various columns; if so, one may suppress the read memory 15 and directly connect the sensing organs 18, to the comparing device 16.

If it is desired to suppress both the output memory 13 and the read memory 15, it is necessary either to provide completely distinct circuits for the recording and detecting operations or to time shift the two operations.

(3) The data entered in the locations of memory 13 (or directly used for recording) as well as the information transferred into the locations of read memory 15 (or directly to the comparing device) need not be binary. For example, the record may be made under the form of light or dark marks, the width of which may have various values and the check reading may be made by means of photo-electric cells, associated to circuits delivering signals whose characteristics depend on the value of the current running through the cells. In such a case, the output signal from decoders 11 and 14 is not manifested simply by the presence or absence of a pulse with determined characteristics, but by a pulse having variable characteristics or by a combination of pulses.

(b) Use of two cascaded memories

Fig. 2 represents a device similar to that of Fig. 1, but wherein both memories have been replaced by two memories 7a and 7b used one for punching and the other for checking, switch 6 being of course suppressed.

The operation is similar to that of the device shown in Fig. 1 with the difference that, at the end of the passage of a card, the signal 33 (which in Fig. 1 controls the switching of memories 7 and 8) is replaced by a signal 34 which through the chains 9 causes memory 7b to be cleared and the content of memory 7a to be transferred therein said transfer being accompanied with the clearing of memory 7a.

The device may be constructed so as to check the accuracy of the punching. The connection between memories 7a and 7b will be replaced in such a case, by a connection between memories 5 and 7b. The control 35 will result in clearing memories 7a and 7b without a transfer being made. The check computing may be effected, according to the program arrangementes either before or after the perforation of the results of the computing to be checked and the results of the check will be transferred in memory 7b after the erasing of the information used for checking the preceding card.

Before clearing memory 7b, it is possible to transfer part or whole of its content to another memory in view of further operations, such as the calculation of a final total from partial totals and the comparison between that final total and a total directly computed from the initial data.

As for the device shown in Fig. 1, it is possible to replace the card punching by other processes for recording on permanent supports.

II. DEVICES WITH INDIRECT CONNECTIONS

The previously described device requires circuits permitting direct transfers between memories, or between memories and decoders; for example, some circuits are used to transfer the information between memory 3 and the adder; others between memory 5 and memory 7; others, switchable with the preceding ones are used for transfers between memory 5 and memory 8, others between memory 7 (or 8) and decoder 11, etc.

As all these circuits comprise rather costly switching or at least interrupting devices, it is advantageous to reduce their number. This is possible because the transfers to be executed are not simultaneous; therefore, common circuits may be given to pulse transfers from or to various organs. The most simple way to perform such reduction is to provide a central organ which all information may reach and towards which they are directed.

If the reading operation of a memory may be made without an erasing operation, said central organ may be simply a directing organ, that compared to a single office exchange. But if the reading operation erases the information, which happens for instance in conventional magnetic core memories, it is necessary to register this information to re-record them; for a memory which has been read in view of the preparation of a line to be punched has to be used again, as was seen, for the checking of this line. Thus, it is necessary to provide a temporary recording register which however may be the just mentioned central organ; thus, this organ is not only a directing organ but also a memory. Thus, the transfer of an information from a memory A to a memory B comprises, for each memory location, the following steps:

Transfer of the information from memory A to the central organ (which erases the information from memory A).

Re-recording in memory A.

Transfer from the central organ to memory B.

Figure 3:
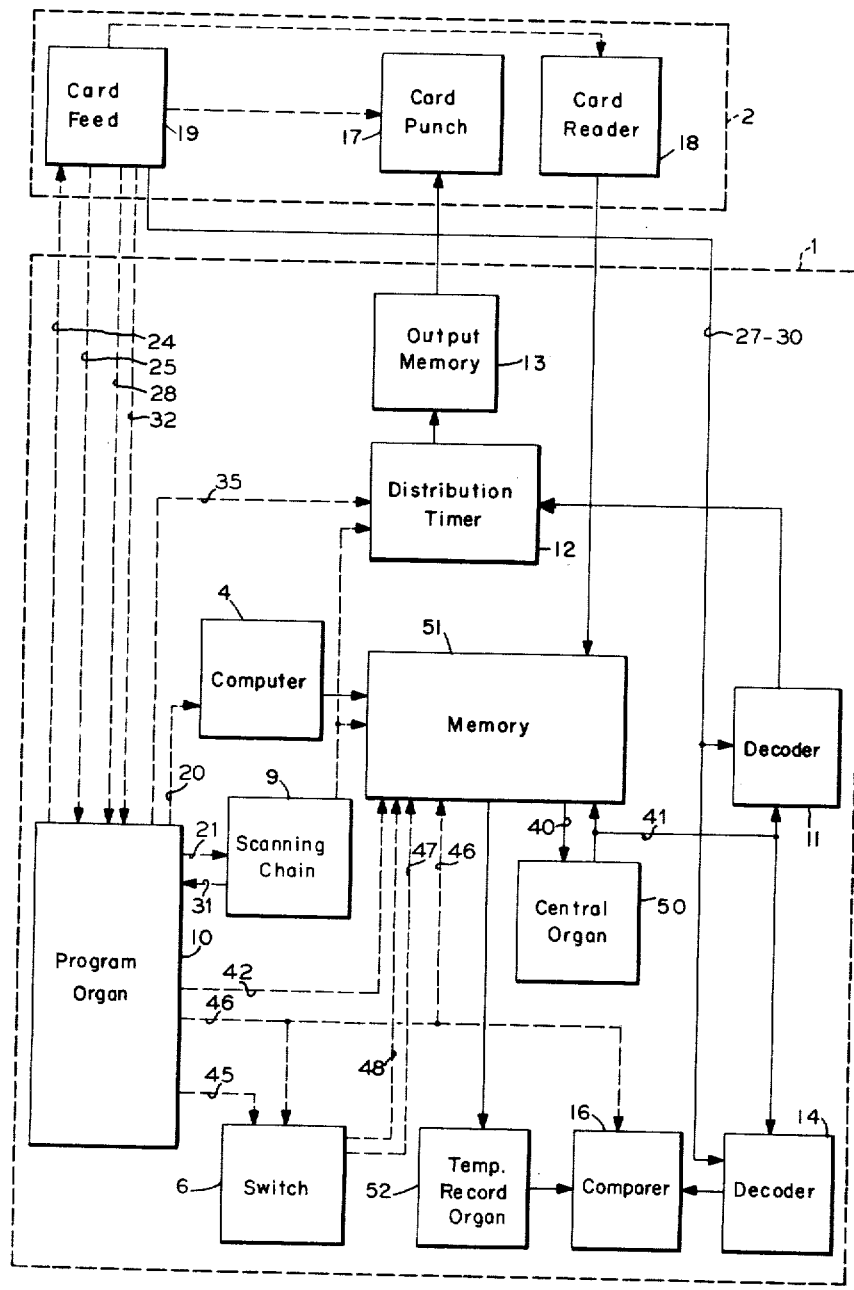
Fig. 3 shows the block diagram of another device also according to the invention but different from the first one in that the direct connections between memories or between memories and decoding organs are replaced by indirect connections through buffer storage registers.
Figures 19, 20:
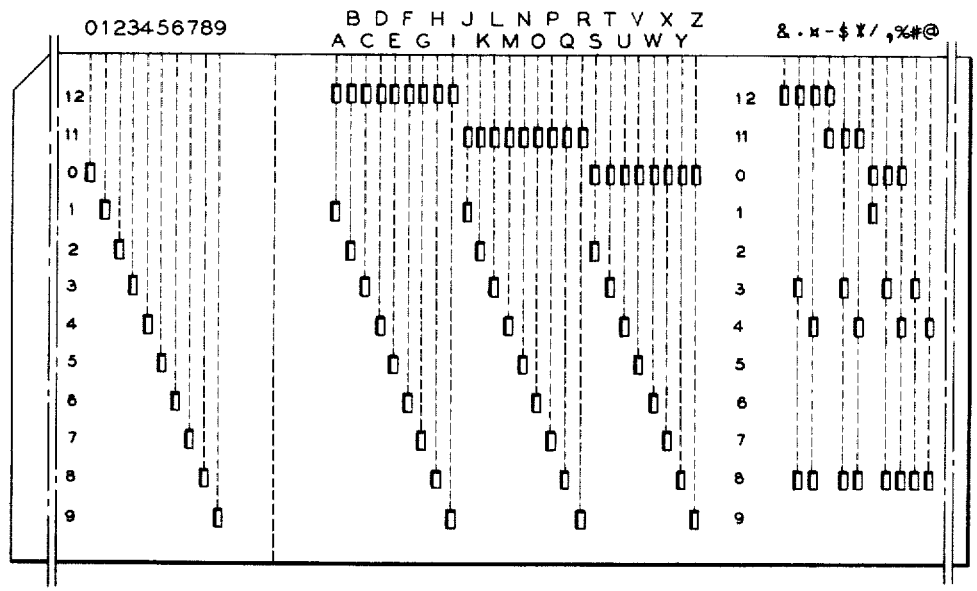
Figs. 19 and 20 show the codes used for the device of Figs. 14a through 14e in the punched cards and in the memories of the computer, respectively.

In Fig. 3, there is shown the general diagram of a device modified in accordance with the principles exposed above. The blocks indexed 4, 6, 9, 10, 11, 12, 13, 14, 16, 17, 18, 19, represent the same organs as in Fig. 1. The central organ is represented by block 50. To said block (50) besides decoders 11 and 14, memories 3, 5, 7 and 8 might have been connected. But there exists arrangements permitting to make the write and/or read circuit of several memories partially common. Hence an only block, indexed 51 is supposed to represent a plurality of memories comprising the above-mentioned memories 3, 5, 7 and 8 as well as the comparing memory 15 and the other memories that the machine may comprise for operations other than those of this invention. The data transfer circuits from these memories to the central organ are represented by line 40. The transfer circuits in the opposite direction are represented by line 41. Signals from the program organ 10 to the read and write circuits are provided to select among the memories that the information of which are to be directed towards the central organ 50, and that which is to register the information from said central organ; the whole of the transmission circuits is represented by line 42. A device suitable for effecting this selection is described in Application No. 704,780, filed Dec. 23, 1957.

It should be noted that the circuits for controlling the data transfer to or from memories 7 and 8 may be switched; in the figure, they are shown not as line 42 but as lines 45, 46, 47 and 48, the connections between circuits 45 and 46 on one hand and 47 and 48 on the other hand being conditioned by switch 6. The line 45 transfers either a scanning control timed with that of memory 5 or a punch scanning control; line 46 transfers a check scanning control. Line 48 controls the scanning of memory 7 and line 48 that of memory 8. Memory 15 is part of the plurality represented by block 51 and its scanning is controlled, as that of the other memories, by a signal derived from the program organ 10; however, its data transfer circuits are not connected to the central organ 50; its recording circuits are connected to the brushes of the punching machine read device 18 and its read circuits are connected to a temporary recording organ 52, which for this memory serves as the central organ 50 for the other memories.

The operation of the device shown in Fig. 3 will now be described briefly. As in the preceding case, it will be supposed that the connected machine is a card punching machine, though other devices for recording on a permanent support may be used.

It is assumed that the first recapitulatory card has been punched according to the information stored in memory 8, and that switch 6 is so conditioned as to let signal 45 pass to circuit 47 which controls the scanning of memory 7.

The computing and the result recording into memory 5 are effected as for the Fig. 1. When it is desired to transfer these results to memory 7, the program organ 10 provides the chains 9 with a signal 21 which places the chains in a position corresponding to a determined location of the memories (preferentially the first one or the last one) and a series of signals which control the advance of these chains from one position to the following one. At the same time, it sends, through one out of lines 42, signals timed with the preceding ones and conditioning memory 5 for transmitting the information stored in the location presently defined by the chains to organ 50, once per chain advance step, and to receive that same information once per chain advance step for re-recording. The program organ 10 also issues, through line 45, switch 6 and line 48, signals which condition memory 7, once per chain advance step, to receive the information from memory 50 in the location presently defined by the chains. The chains which scan memory 7 are timed with those scanning memory 5 but are different from these. Such a transfer has been described in detail in the above-mentioned application No. 704,780, filed Dec. 23, 1957.

In a further step of the program, the punching and checking are effected in the following way:

(1) The program organ 10 controls the punching machine feed and the advance past the read brushes of the card previously punched by means of a signal 24.

(2) Before each card row is punched, the punching machine provides a signal 25 which causes the program organ 10 to provide signals controlling the starting and advance of the scanning chains (connection 21) and signals timed with the preceding ones (connection 46). Due to connections 46—47, the latter signals condition memory 7 (in the chosen example) once per chain advance step, successively to transfer the information stored in the location presently defined by the scanning chains to organ 50, then to receive this information back. The organ 50 also transfers said information to decoder 11 which, if this information corresponds to the number of the row which is to pass under the punches, delivers a pulse to timer 12 (as for Fig. 1, the conditioning of the decoder by the punching machine has been symbolically represented by line 27). The timer 12 is scanned by the chains 9, at the same time as memory 7; a signal 35 produced by the program organ 10 permits it to send the pulse it eventually receives from decoder 9 to the position of the output memory 13 corresponding to the actually scanned location (when the chains perform a scanning for another reason than preparing the punching of a row, signal 35 does not exist and the scanning of timer 12 is ineffective).

(3) When each card row is read, the punching machine produces a signal 28 which causes the program organ 10 to provide signals controlling the starting and advance of the scanning chains (connection 21) and (due to connection 46—48) so conditioning the memory containing the information used for the preceding card perforation (memory 8 in the chosen example) once per chain advance step, as to transmit the central organ 50 the information presently stored in the location presently defined by the scanning chains, then as to receive this information back (re-recording being not necessary for the punching and checking operations, but possibly useful for other functions of the machine). The organ 50 also transmits this information to decoder 14 which, if this information corresponds to the number of the just read row, delivers a pulse to the comparing device 16 (the conditioning of decoder 14 by the punching machine is symbolically represented by line 30, which is supposed the same as line 27, as was mentioned above).

At the same time as the signals condition memory 8 so as to allow the before mentioned transfers, the program organ 10 produces signals causing the comparing memory 15 (storing the information which have been just read in the card being checked) to transfer to organ 52, once per chain advance step, the information stored in the memory location presently defined by these chains (it is reminded that this information simply indicates the presence or absence of a perforation). At the same time as the organ 50 transfers information to decoder 14 (and hence permits eventually a pulse to be sent to device 96) the organ 52, if the location presently scanned indicates the presence of a perforation in the card, provides that same device 16 with a pulse. The presence of a pulse from one of the organs 14 and 52 combined with the absence of a pulse from the other organs 14 and 52 combined with the absence of a pulse from the other organ is indicated by an error signal, provided however that device 16 receives a signal 46 which exists but during the comparing scanning.

The processing from one scanning to the next one, the resuming of the program after the passage of a card, the special arrangements for the punching of the first card, and the checking of the last one are performed in the same way as for the device shown in Fig. 1.

As was done for Fig. 1, it is possible to replace the two memories 7 and 8 by a punching memory 7a and a checking memory 7b, the switch being suppressed. If so, the switching after the passage of a card is replaced by the transfer of the content of memory 7a to memory 7b (through central organ 50) under the action of the scanning chains. It is also possible, instead of effecting said transfer to record the result of the checking computation in memory 7b, which permits the simultaneous checking of the accuracy of both the punching and the computation.

After functions of the various organs being described, there will be described in a more detailed way an embodiment in accordance with the diagram of Fig. 3. In order to simplify this description and the illustrative drawings there will be described first the component circuits which will be represented in a simplified way in the detailed diagram.

III. COMPONENT CIRCUITS

Amplifiers and inverters

In the hereafter described circuits, one may use amplifiers and inverters of such types as described further. It is obvious, however, that selecting such types is no part of the invention, and they may be replaced by other types having similar functions.

Fig. 4 shows the diagram of an inverter using a P-N-P transistor; further on, such an inverter will be represented by the simplified diagram shown in Fig. 4a, that is, by a block having written therein letter I, eventually followed by an indicia, the lower left line representing the input circuit and the upper right line representing the output circuit.

Fig. 5 shows a follower emitter amplifier using a N-P-N transistor; it is known that such an amplifier does not amplify voltages but only magnitudes; further on, such an amplifier will be represented by the simplified diagram shown in Fig. 5a, that is, by a block having written therein letter E eventually followed with an indicia, the left line representing the input and the right line the output.

Fig. 6 shows a two stage non-inverting amplifier. Such an amplifier will be represented in a simplified way by the diagram of Fig. 69, i.e., a block having letter A possibly followed with an indicia written therein, the input being represented on the lower left part of it, and the output on the upper right part.

Triggers

Fig. 7 shows the diagram of a trigger that may be used in the further described circuits.

Such a trigger will be represented, as shown in Fig. 7a, by a square bearing letter B, possibly assuming an indicia. The two outputs 74 and 75 are respectively represented up on the left and up on the right; when the voltage at the left output is more positive than at the right output, the trigger will be conventionally said "off"; in the opposite case it is said "on." The inputs are represented in the lower corners A positive pulse applied to the left input 71 switches the trigger "off" (if already "off" its state does not change) a positive pulse applied to the right input 72 switches it "on," and does not change its state, if it is already "on." A pulse applied to the middle lower input 73 switches the trigger. It is to be understood that when input 73 is not used it will not be represented in the figures.

Thyratrons

The thyratrons used in the embodiments of the invention are two grid thyratrons such as type 2D21. The circuitry for these thyratrons is shown in Fig. 8. Both grids are normally biased to a negative voltage and the ionization of the thyratron requires the provision to both grids of a sufficient voltage increase.

The thyratrons and their circuits will be represented in a simplified way, as shown in Fig. 8a, by a block having the indication TH possibly followed with an indicia written therein; both inputs are shown down on the left and the output up on the right.

Coincidence or "AND" circuits

These circuits transfer a positive pulse to their output only if all their inputs receive a positive pulse.

Fig. 9 shows the diagram of such a circuit, and Fig. 9a, a simplified diagram which will be used in the drawings attached to this specification.

Mixing or "OR" circuits

Such circuits transfer a positive pulse to their output whenever one at least of its inputs receives a positive pulse. Fig. 10 shows the diagram of such a circuit and Fig. 10a is the simplified diagram used.

Diode gates

A diode gate (Fig. 11) is a two-input circuit; one of the inputs, 91 which will be referred to as "slow input" receives a positive pulse via a resistance, and the other, 92 (which will be conventionally called "quick input") receives a positive or negative pulse via a capacitance. Both these inputs are connected to the same side of a diode; the output 94 is made of the other side of said diode; the diode is conducting in the input-output direction. The diagram of such a circuit is shown in Fig. 11; its simplified diagram is represented in Fig. 11a, the lozenge indicating the slow input.

The operation waveforms for such a circuit are shown in Fig. 13c to i representing voltages at point 93 and j to L representing voltages in point 94. In all these figures, the abscissa line represents the voltage at the inputs without a signal (said voltage will be conventionally referred to as zero voltage, whatever may be its value with reference to ground).

At c, it is assumed that a positive voltage is applied from time $t1$ to time $t4$ on the slow input only. The condenser being not possibly charged instantaneously said voltage will not be established immediately in point 93 but will increase according to an exponential function which is determined by the time constant of circuit RC which acts as an integrating circuit (c); at time $t4$, the voltage in point 93 will not fall immediately to zero, but will decrease according to a similar law.

At d, it is assumed that a positive voltage was applied, within the same times $t1$ and $t4$, to the quick input only. In this case, the voltage in point 93 assumes the same value immediately, then decreases at once while the condenser is charging; circuit RC acts here as a differentiating circuit and its time constant determines the decreasing rule. When the signal is interrupted (time $t4$) an inverse negative voltage is immediately established in point 93, since the condenser cannot discharge instantaneously, and the voltage increases to zero according to a similar law.

If equal positive voltages are simultaneously applied to both inputs (e), a voltage having the same value appears immediately in point 93 since the voltage difference between both condenser plates does not change; in the same way, if both signals are simultaneously interrupted the voltage in point 93 falls immediately to zero. But if the positive voltage is applied to the slow input at time $t1$ and to the quick input at a posterior time $t2$ when the condenser charge is practically consumed (f), the voltage in point 93 will increase on time $t2$ by a value equal to that applied to the quick input, thus it will assume a peak value equal to that of the sum of the voltages applied to both inputs. It is well understood that it will decrease and assume a value equal to that of the voltage applied to the slow input. Besides, it was supposed that the signal applied to the quick input was interrupted at a time $t3$ anterior to time $t4$ when the signal applied to the slow input was interrupted; in such a case, the voltage in point 93 momentarily assumes a value near to zero (if both signals have the same magnitude) then increases again.

In the example shown at g, a positive signal is once more applied to the slow input from time $t1$ to time $t4$, but a negative signal is applied to the quick input from $t2$ to $t3$. In such a case, the voltage in point 93 momentarily decreases at time *t*2 and then at time *t*3 assumes a peak value near to the sum of both applied voltages.

Referring to *h*, a positive voltage is applied to the slow input between times *t*1 and *t*2, and a positive voltage (having the same magnitude as the first one, in the case shown in the figure) is applied to the quick input between times *t*2 and *t*3. When so, there occurs an immediate voltage increase followed with a very rapid decrease down to zero in point 93 at time *t*2; for the voltage between the condenser plates is to undergo a shift equal to the sum of both signal magnitudes, i.e., twice the magnitude of one signal if both magnitudes are equal, and the rapidity of the voltage shift in that point is a function of the total shift.

At *i*, it is assumed that a positive voltage is applied to the slow input within times *t*2 and *t*3 and that a negative voltage was applied to the quick input between moments *t*2 and *t*3. When so, at time *t*3 there will occur a voltage shift similar to that happening at time *t*2 in the preceding case.

Hereinbefore, the voltage in point 93 only was considered. If we examine now the voltage in point 94, i.e., at the gate output, and if said point is supposed to be connected through a resistance to a D.C. source having a voltage at least equal to the magnitude of the signals applied to the inputs, the only voltage shifts which make the voltage in point 93 superior to that continuous voltage will be transmitted; thus, the result will be:

In the cases corresponding to *c*, *d* or *e*, a D.C. voltage shown at *j*.

In the cases corresponding to *g*, a voltage peak at time *t*3 (*k*), (in the case shown at *h*, said peak would have occurred at time *t*2).

In the case corresponding to *i*, a very short voltage peak at time *t*3 (*b*) (in the case corresponding to *i*, such peak would have occurred at time *t*2).

Thus, it is seen that, to get an output signal, a positive signal is to be applied to the slow input previously to the positive shift of the signal applied to the quick input (i.e., of the leading edge of this last-named signal if it is positive, and of its trailing edge if it is negative).

The output signal is coincident with the positive shift of the signal applied to the quick input. The positive signal applied to the slow input may be interrupted after that positive shift, or substantially at the same time; in the latter case, the output signal is very short.

Therefore, a diode gate acts practically as a coincidence circuit but differs in that the signal appearing at the slow input has to be applied previously.

In the above, the terms "signals applied to the quick input" imply the voltage shifts applied to that input, whatever may be the D.C. voltage eventually superposed on these shifts.

Sometimes the slow input is kept under a fixed voltage preferentially equal to the output voltage when no signal is applied, and in all cases the gate transfers the positive voltage shifts applied to the quick input. The diagram representing such an arrangement is shown in Fig. 12 and its simplified diagram in Fig. 12*a*. (It is to be remarked that the ground potential shown in these figures is not the previously considered zero potential but a D.C. potential positive with respect to that zero potential.)

It is obvious that the same logical operations may be made with negative signals as well as positive signals; there is but to invert the direction of the diodes in Figs. 11 and 12 (without it being necessary to precise the position of the zero potential relative to the ground potential).

IV. DETAILED DESCRIPTION OF A DEVICE WITH INDIRECT LINKAGE

An example of realization of a device according to the Fig. 3 diagram is shown on Figs. 14*a* through 14*e*. It is well understood that various changes may be made to the diagram shown in these figures. In particular, it is possible to interpose, on the path of the pulses, AND and OR circuits which do not modify the path of said pulses when the machine is operated according to the invention (preparation, performance and checking of holes), but which stop certain pulses or allow pulses of different origin to enter in case of other operations partially using the same circuits.

Fig. 15 shows the ways Figs. 14*a* through 14*e* are to be assembled. The various components of the main machine keep the same relative positions as on Fig. 3. On the contrary, in order not to overcharge the drawing with connecting lines, the punch components have been separated. Punch mechanism 17 is shown in Fig. 14*e*, the reading brush assembly in Fig. 14*c* and the drive mechanism in Fig. 14*a*. In all these figures, Fig. 3 reference numbers have been kept, and for the new references the following have been chosen:

For the amplifiers, inverters, triggers, thyratrons: letters followed by symbols.

For the AND circuits, OR circuits, diode gates, wires: numbers.

However, the circuits transmitting fundamental timing pulses and the information have particular references.

Computing element 4, which may be of any type, is not shown.

The other components are going to be described, starting with those which are but shown in a block form, because they have already been described in other patents or other patent applications.

Punch

The punch is of the type described in U.S. Patent No. 2,603,416, with the changes specified further. The card reading and analyzing element is not used in summary punching and checking operations; the punching and checking element and the drive mechanism only will be taken into account. These parts of the machine differ from those, which are described in the above-mentioned patent, on the following points:

(1) The totalizers are either removed, or disconnected in order to be used only in other machine operations;

(2) The punch electromagnet pick-up circuits are made up of the thyratron plate circuits of the main machine output 13 storage unit, as it will be explained further on, during the description of said storage unit;

(3) The reading brush circuits are connected to the reading circuits of the machine reading storage, as it will be explained in the description of said storage;

(4) The cam shaft comprises the necessary cams to send the pulses which will be specified during the description;

(5) The circuit which picks up the clutch electromagnet (which insures the feeding of a card under the punches at the same time as the feeding of another card under the checking brushes), is controlled by a signal transmitted by the main machine.

Storages

The description hereunder concerns storages 3, 5, 7, 8 and other storages eventually used by the machine, but it does not concern output storage 13 (with thyratrons), nor reading storage 15 (with magnetic cores, but one core only per position) which will be described further.

The above-mentioned storages 3, 5, 7, 8 are magnetic core storages of a well known type. Each storage comprises 80 positions each comprising 7 cores, each core having two stable states, which will be named conventionally "active state" and "neutral state." The 7 cores of one position will be respectively called 1, 2, 4, 8, A, B, C. The first six are used to specify a numerical, alphabetical or other character; the last one is reserved for control operations; its state must be such that the number of active state cores be odd.

The 80 positions are assembled in 8 groups of 10; these groups are numbered from 0 to 7 and the units in each group of ten are numbered from 1 to 10. Each core is crossed by a group of 10 lines (common to all the cores of a same group of 10 of a same storage), a unit line (common to all the cores having the same unit number in all the groups of 10 of all the storages), a reading line (common to all the cores having the same designation; there is a total of 7), an inhibition line (common also to all the cores of a same designation). Each group of 10 lines is fed by the output of a 2 input coincidence circuit, one input defining the group of 10 and common to all the storages, the other defining the selected storage. The reading of a storage position requires 3 pulses: one to each entry of the circuit feeding the group of 10 lines and one to the unit line characterizing the selected core; the information is collected on the reading lines; the reading operation has for a result to bring the read core back to the neutral state. The recording of information in a position requires 3 position pulses (to the same lines as for reading, but backward) and an inhibition pulse to the lines crossing the position cores which must not change state (for example, when writing digit 5, characterized by the coming to the active state of cores 1, 4 and C, inhibition pulses will be sent to lines 2, 8, A, B). The travel of the pulses in the group of 10 and unit lines occurs through amplifiers (not shown). The releasing of these amplifiers and their choice which determines the direction of the current, are controlled by "reading pulses" or "writing pulses" transmitted by two individual circuits, marked Lec and Ec.

These operations will not be explained in detail since they are already described in the above-mentioned copending application No. 704,780.

In the figure, the magnetic core storages, including reading storage 15, as a whole, are represented by rectangle 51. The lines through which are transmitted the storage selection pulses, are designated, as in Fig. 3, by references 42, 46, 47, 48, a pulse sent to line 42 having for a result storage 5, to line 47, storage 7, and to line 48, storage 8. A pulse transmitted by line 46 selects reading storage 15; moreover, as shown previously, these pulses are transmitted to line 47 or 48 in order to select storage 7 or 8. The circuits that transmit the group of 10 characteristic pulses are designated by references D0 to D7, and those that transmit the unit pulses by references V1 to V10. The pulses collected on the reading lines are amplified and sent, through circuits L1, L2, L4, L8, LA, LB, LC, to central element 50.

Scanning chains

The scanning chains are represented by rectangle 9. They are of the type described in the above-mentioned copending application No. 704,780. A detailed description of these chains will not be given, but it will be merely recalled that there are two groups of chains respectively referred to as group A and group B; in each group there is a group of 10 chains and a unit chain. The group of 10 chains comprises 8 triggers numbered from 0 to 7, one of them at most being in operating state. Consequently, to "advance A" pulses, the "units A" chain trigger, which was in operating state, switches to rest state and the immediately lower rank trigger switches to operating state; if the operating trigger were trigger 1, trigger 10 would switch to operating state and, in addition, the group of 10 chain A trigger, which was in active state, is replaced with the immediately lower rank trigger. B chains progress in a similar manner owing to "advance B" pulses.

The output circuits for the chains as a whole include the 8 group of 10 circuits D0 to D7, and the 10 unit circuits U1 to U10 transmit the group of 10 and unit pulses, mentioned in the storage description. Since the time is divided, as it will be seen later, in alternations respectively called A and B, the chains will issue:

During A alternations a pulse to the group of 10 lines and to the unit lines having respectively the same number as the "group of 10A" chain trigger and that of the "unit A" chain, presently in the active state;

During B alternations, a pulse to the group of 10 lines and to the unit line having respectively the same number as the "group of 10B" chain trigger and that of the "unit B" chain presently in the active state.

The picking up of the chains and their reset are controlled by pulses transmitted by individual circuits.

Central elements

The central element comprises seven triggers each corresponding to one of the 7 circuits L1, L2, L4, L8, LA, LB, LC, which receive the pulses from the reading lines. Every pulse transmitted by one of said reading lines during a reading pulse switches the corresponding trigger to operating state, i.e., makes its right output positive. The left output of the other triggers, also positive, transmits pulses to the inhibition lines during the writing pulses for the recording of the information erased by the reading. The circuits that send pulses to the inhibition lines are respectively designated by $(\overline{1})$, $(\overline{2})$, $(\overline{4})$, $(\overline{8})$, $(\overline{A})$, $(\overline{B})$, $(\overline{C})$.

A detailed explanation will not be given for central element 50, which is described in the above-mentioned copending application No. 704,780.

In said patent application, the 7 triggers are respectively designated by 1R, 2R, 4R, 8R, AR, BR, CR, the reading lines by 347 and the inhibition lines by 358.

Storage unit

The storage unit shown in Figs. 14a and 14b comprises the following parts:

Hub panel 43 (Fig. 14a)
Timing circuits (Fig. 14a)
Punch gate circuits (Fig. 14b)
Punch scanning trigger circuits (Fig. 14b)
Check scanning trigger circuits (Fig. 14b)
Accelerated scanning gate circuits (Fig. 14b)

Hub panel

Hub panel 43 is shown in Fig. 14a on the left. Only the hubs used in the operations concerning this description are shown.

The hubs shown may be classified in the following manner:

(1) Program stage hubs (according to the current terminology, a "stage" will designate the succeeding steps of a computing program or, in a general manner, machine operation program); to each program stage is effected a group of 5 hubs including:

An input hub; this hub receives a pulse proceeding, through a removable connection, from the output hub of the preceding stage (or, for the first stage, from the program start hub); this pulse, having no effect as long as the preceding stage goes on, operates only in cooperation which with a stage end signal (or, for the first stage, a program start signal) owing to a coincidence circuit which is not shown; this coincidence has for effect to start a trigger which is not shown and to send, thus, to the 2 output hubs a pulse that will last during the whole stage.

Two output hubs; these 2 hubs transmit a pulse during the whole stage owing to removable connections; one to the hub defining the operation to be performed during the step (hub which will be mentioned later); the other to the input hub of the next stage;

An A area hub and a B area hub; these hubs receive during the stage, respectively a pulse during the A alternations, a pulse during the B alternations; these two hubs are used to define the selected storages and eventually the areas selected in said storages.

The following hubs may be also classified among the program stage hubs:

The program start hub which receives the program start pulse.

The program end hub which is wired to the output hub of the last utilized stage.

The figure shows only the program start hub Jd, the program end hub Jf and the hubs corresponding to two stages (hubs J1 to J5) and (J'1 to J'5).

(2) Operating hubs: the hubs transmit the pulses they receive through removable connections of the above-mentioned output hubs, to circuits controlling the various operations that the machine is liable to perform. Two operating hubs only are shown: one, Jt controls the transfer of a storage into the punch storage, the other Jp, controls the punching of a card (and, at the same time, the checking of the preceding card).

(3) Storage defining hubs: these hubs receive a pulse proceeding either from the A area hub, or from the B area hub. They transmit this pulse to the circuits defining the storage which will be scanned during the A alternations and the one that will be scanned during the B alternations.

The connection between areas A or B hubs on one hand and storage on the other hand is performed through other hubs, and this offers various possibilities, the explanation of which would be out of the object of this description. The figure shows only two jacks; one, J5 allows to control the scanning of storage 5, the other, J7–8, allows to control the scanning of storage 7 or of storage 8 according to the state of switch 6.

*Timing circuits*

The timing circuits are shown in Fig. 14a and comprise pulse generator 42, inverter 100, AND circuit 101 and OR circuits 102, 103, and 104 (the last two being used as coincidence circuits for negative pulses).

Generator 42 supplies alternation pulses and read and write pulses. No description will be given of this generator which may be of any type and may be more particularly made up of 4 emitters described in the above-mentioned copending application No. 704,780.

It is sufficient to indicate the shape of the pulses supplied by this generator and shown on the curves of Fig. 16.

A alternation pulses and B alternation pulses (a and b curves) alternating regularly.

Read and write pulses (c and d curves); the duration of these pulses is about equal to ¼ of that of the alternation pulses, there is, during each alternation, a read pulse during the second quart and a write pulse during the fourth quart.

Starting from the pulses supplied by generator 42, the following pulses occur:

Advance pulses (curve e); they are negative pulses that coincide with write pulses; they are obtained through inverter 105.

A and B pulses: during normal operation, i.e., when the accelerated scanning gate is not open, A pulses coincide with A alternation pulses and B pulses coincide with B alternation pulses; but, when the accelerated scanning gate is open, a negative pulse, transmitted by line 105, blocks AND circuit 101 and this eliminates the A pulse, while a positive pulse is transmitted by line 106 and goes through OR circuit 102, and the B pulse becomes permanent.

A advance pulses: they are negative pulses obtained through coincidence of advance pulses with A inverted pulses owing to negative coincidence circuit 104 (as a matter of fact, during the A pulses, there is a negative voltage on line B). When the scanning gate is closed, the A pulses follow the cadence shown on curve f and when said gate is open, they are eliminated.

B advance pulses: they are negative pulses obtained out of coincidence of advance pulses with inverted B pulses, owing to negative coincidence circuit 103; when the accelerated scanning gate is closed, the B pulses follow the cadence shown on curve g, and when it is open, they coincide with advance pulses (curve e).

Of course, it is possible to replace the above-mentioned circuit with any device supplying the same pulses: moreover, the 1:4 ratio between the length of the read, write or advance pulse on one hand, and that of the alternation pulses on the other hand, is not imperative; it is sufficient that the read and write pulses have durations allowing to really perform the reading and writing operations, and be separated by a sufficient interval to allow correct operation of the circuits receiving the read pulses, and that, in addition, the trailing edge of the advance pulses (which do not necessarily coincide with the write pulses) coincide with the alternation changes.

In the figure, the lines that transmit the pulses supplied by the timing circuits bear the following references:

Advance pulses: A$\nu$(N)
A pulses: A
B pulses: B
A advance pulses: A$\nu$A(N)
B advance pulses: A$\nu$B(N)
Read pulses: Lec
Write pulses: Ec Indication (N) is to recall that the circuits transmit negative pulses.

*Punch gate*

The punch gate, shown at the bottom of Fig. 14b, comprises a trigger B1, normally in rest state. Said trigger is switched to operating state:

Either by an advance pulse transmitted by diode gate 110 favored by a pulse proceeding from hub Jp (Fig. 14a) which, as already mentioned, receives a pulse when a punch is to be controlled. No description will be given of the manner to obtain this pulse since it is out of the object of the present invention, and since it can be obtained through all the classical means in the electronic calculating machine field.

Or by a pulse proceeding from the right output of trigger B2 and differentiated by diode gate 112; trigger B2, normally in rest state, is switched to operating state by a pulse proceeding from hub Jf (Fig. 14a) and indicating that the computation program is over. This pulse is transmitted by diode gate 113, favored by a pulse transmitted by line 114 and indicating that there is no more card being read in the main machine. No description will be made of the means used to obtain these pulses since they are well known and out of object of the invention. The duty of trigger B2 is to allow the opening of the punching gate (i.e., the switching to operation of trigger B1) at the end of the machine operations, in order to allow the summary feeding of the last punched card under the punch reading brushes and its checking. As it will be seen later, trigger B2 prevents, in this case, the punch to operate.

Right output 117 of trigger B1 is connected to coincidence circuit 121; the other of said circuit proceeds from inverter I1, the input of which is made up of circuit 32 which transmits a signal indicating that the last line of a card is going to be punched; coincidence circuit 121 output is connected to the entry of an A amplifier having its output 24 controlling the feeding of a card in the punch.

Trigger B1 remains in operation during punching and checking. It is reset by an advance pulse transmitted by favored diode gate 119, which is favored by a coincidence circuit 120 with three inputs which respectively receive:

One, a pulse transmitted by above-mentioned circuit 32 indicating that the card last line has been punched.

The other, a pulse 161 proceeding from the accelerated scanning gate circuits and indicating that the scanning is over; the proceeding of this pulse will be explained later.

The third, a pulse 46 proceeding from the check scanning trigger circuits and indicating that the scanning being performed was a check scanning.

As it will be seen further, the reset of trigger B1, takes place along with a switching of storages 7 and 8, excepted for the last card.

Trigger B2 is reset by an advance pulse transmitted by diode gate 121 favored by a pulse supplied by coincidence circuit 129, when trigger B1 is back in inoperative state.

*Punch scanning trigger circuit*

These circuits comprise three triggers B3, B4, B5, having the following duties:

Trigger B3: recording of signals transmitted by the punch before the passage of each card line under the punches. This trigger remains in operation during a whole signal.

Trigger B4: recording of the scanning request; this trigger, set in operation by the preceding one if the last card has not yet come up, remains in this state until the end of the scanning.

Trigger B5: scanning release; this trigger is set to work by the preceding one providing that the punch gate is open and the accelerated scanning gate is closed (this latter condition is to avoid simultaneous control of a punch scanning and other scanning operations); switching into operation of this trigger B5 has for a result to open the accelerated scanning gate and to release scanning. Trigger B5 is reset at the same time as trigger B4.

Trigger B3 is set to work by the trailing edge of an advance pulse transmitted by diode gate 130 favored by pulse 25 already mentioned in the general description concerning Fig. 3. It is reset by the trailing edge of an advance pulse transmitted by diode gate 131 favored by the elimination of said pulse 25, and this results in a positive pulse at the output of inverter I2.

Trigger B4 is set to work by the positive variation of voltage obtained through the right output of trigger B3 when it switches into operation; said variation is transmitted by diode gate 132 favored by the left output of trigger B2 already mentioned in the punch gate description. Consequently, the trigger can be set to work only if B2 is at rest, i.e., if the last card is not being fed.

Trigger B5 is set to work by an opening pulse from the accelerated scanning gate, the production of which will be explained later; said pulse is transmitted by line 158 to diode gate 134 favored by the right output of trigger B4.

Triggers B4 and B5 are reset by a closing pulse for the accelerated scanning gate, the production of which will be explained later; said pulse is transmitted by line 164 and diode gate 136 favored by the right output of trigger B6.

Output 35 of trigger B5 is connected to:

(1) Distributor 12 (Fig. 14c) to allow operation of said distributor.

(2) One of the inputs of OR circuit 137; the other input is connected to hub J7-8 (Fig. 14a) which receives a pulse owing to a removable connection, when an information transfer is to be performed to one of storages 7 or 8 (i.e., to transfer to them the contents of storage 5). The output of this OR circuit is marked 45 as in Fig. 3.

(3) OR circuit 150 to release scanning.

*Check scanning trigger circuit*

These circuits comprise triggers B6, B7, B8 which have, for check scanning, the same duty as triggers B3, B4 and B5 for punch scanning, signals 28 transmitted by the punch after checking each card line replacing signals 25 transmitted before the punching of each line. No detailed description of these circuits will be given, since their elements have the same reference numbers as those of the punch scanning trigger circuits increased by ten units (excepted for trigger B8 output which is marked 46 as in Fig. 3); but it will be pointed out that there are two differences with these latter circuits:

(1) Switching to operation of trigger B7 is always caused by that of trigger B6 (since scanning is to be released in the last card case).

(2) A coincidence circuit 149 prevents diode gate 134 (which controls the release of trigger B8) from being favored if trigger B4 is operating at the same time as trigger B7, i.e., if a punch scanning request is recorded at the same time as a check scanning request. Trigger B8 will have the possibility to switch to operating state only after reset of B4, i.e., after the end of the punch scanning.

Thus, it is possible to receive simultaneously signals 25 and 28 and to use them one after the other; the advantage of this arrangement is obvious, since signals 25 and 28 produced by electromechanical devices have a notably longer duration than the scanning operations they release; to receive them simultaneously reduces by half the time assigned to the scanning operations and their control.

Of course, if the use of the machine includes other scanning operations synchronized by signals of electronic origin (in view of card reading, printing or other operations) it is possible to adopt similar devices allowing the reception of simultaneous timing signals and their successive utilization: it is sufficient to choose a sequence of succession and to provide coincidence circuits similar to circuit 149 preventing the release of a scanning operation when one or several requests concerning scanning operations which are to precede it are recorded.

Output 147 of trigger B8 is sent to:

(1) comparing device 15 (Fig. 14c) to allow operation of this device as it will be explained further.

(2) commutator 6 (Fig. 14c) to define the storage to be scanned.

(3) OR circuit 150 to release scanning.

*Accelerated scanning gate*

The accelerated scanning gate circuits include triggers B9 and B10 and several associated circuits. Trigger B9 stays in operation during a whole scanning. Trigger B10 switches to operating state at the end of a scanning and stays in operation only the time necessary for the passage of an advance pulse.

Trigger B9 is set to work by an A advance pulse transmitted by a diode gate 152 favored by scanning release line 151 from OR circuit 150, the inputs of which are made up of the right outputs of triggers B5 or B8; switching to operation of B9 occurs consequently at the same time as a punch scanning release or a check scanning.

Switching to operation of trigger B9 has for a result as it has been explained in the timing circuit description to eliminate A pulses (and consequently, A advance pulses) and to make the B pulse permanent (the B advance pulse consequently intermingles with the advance pulses).

It is thus possible to scan a storage position at each advance pulse, even though during normal machine operation, a position is scanned only every other advance pulse; this is possible because a single core storage is used in punching and checking scanning operations, knowing that the other machine operations generally require two storages. Moreover, right output 106 of the trigger is wired to an input of OR circuit 154 used as a negative pulse coincidence circuit; the other input 155 of said circuit is wired to the left output of trigger B1 of the punch gate. A negative pulse will reach output 156 of circuit 154 only if the following pulses are obtained:

A negative pulse 106 (i.e., if the accelerated scanning gate is not open).

A negative pulse on 153 (i.e., if the right output of B1 is positive, that is, if the punch gate is open).

OR circuit 157 used as a coincidence circuit for negative pulses receives on one of its inputs the negative pulse transmitted by 156 and on the other, the advance pulses.

The pulses obtained on output 158 of OR circuit 157 are the opening pulses for the accelerated scanning gate which switch to operating state trigger B5 (or trigger B8) if trigger B4 (or B7) allows it.

Trigger B9 is reset by an advance pulse B transmitted by diode gate 159 favored by the output of coincidence circuit 160 to the inputs of which are connected To right output 117 of trigger B1 (punch gate).

To circuit 31 proceeding from the chain and transmitting the scanning end pulse.

The reset trigger B9 takes place along with the switching to operating state of scanning end trigger B10; said trigger is reset by the following advance pulse, transmitted by diode gate 161. While B10 is in operation, its right output 163 is positive, which is, as already stated in the scanning gate description, is a condition necessary for the reset of B1 (162 being connected to coincidence circuit 120). Moreover, during the same time, left output 163 of B10 is negative; said output is wired to an input of OR circuit 164 used as a negative coincidence circuit, the other input of 164 receives the advance pulses; consequently, only the advance pulse which follows the switching to operation of B10 (and which, as previously stated, resets B10) is transmitted onto output 165 of 164; this pulse is the gate closing pulse which, as already stated, resets triggers B4, B5, B7 and B8.

Switch

Switch 6 is shown in Fig. 14c, at the lower left, and is made up of trigger B11, favored diode gate 170, coincidence circuits 171, 172, 173, 174 and scramble circuits 175 and 176.

Trigger B1 switches (i.e., switches to rest state if it was in operation and switches to operating state if it was at rest), owing to an advance pulse transmitted by diode gate 170 favored by a pulse from line 125; said line proceeds from coincidence circuit 126 (Fig. 14b), at the lower right, the inputs of which receive:

The first one, the signal from coincidence circuit 120 and indicating the coincidence of the end of card passage in the punch (32) with a check scanning end (46 and 161).

The other, the signal from the left output of trigger B2 and indicating that the last card case has not been reached.

Thus, trigger B11 switches when the last line of a card has checked, excepted when this card is the last summary punch card used in a machine operation; as a matter of fact, in that last case, no punching occurred jointly with the checking; if the checked storage were storage 8, storage 7 is empty and there may be an advantage, in case of restart, to keep the information recorded in storage 8 and to use, consequently, storage 7 for the first punching.

It appears on the figure that, when trigger B11 is operating, the pulses from line 45 (control of the scanning operations for punching or filling the punch storage) are transmitted to line 47 (switching of storage 7 to scanning, by coincidence circuit 171) and, while the pulses from line 48 (check scanning control) are transmitted to line 48 (switching of storage 8 to scanning) by coincidence circuit 174. When trigger B11 is at rest, pulses 45 are transmitted to 48 through 172 and pulses 46 are transmitted to 47 through 173.

Decoders

Decoders 11 and 14 are shown in Fig. 14d. They are similar; consequently, decoder 11 only is shown in detail. Said decoders are used for the transformation contrary to that described in the patent application.

Figs. 13a and 13b respectively show the input code used to record the types into the magnetic core storages, and the output code used for punching.

Anyway, it could be possible, without altering the object of the invention, to utilize any other input and output codes by using suitable decoders.

Decoder 11 is made up of circuits crossing several relay contacts having their pick up depending of cams located in the punch. The relays are designated by R1, R2, R4, R8, RA, RB, RS and Rs' (for multi-contact relays, the coil is shown several times to make the drawing clear, but, of course, there may be only one coil). The relay pick up circuits are designated by references 201 to 208; said references appear again in Fig. 14a, at the output of the punch "synchronization" part 19; the junction of the punch with the decoder is not shown so as not to overcrowd the figure.

The relay contacts control the passage of pulses (1), (2), (4), (8), (A), (B) and ($\bar{1}$), ($\bar{2}$), ($\bar{4}$), ($\bar{8}$), ($\bar{A}$), ($\bar{B}$) from central element (50). It must be noted that, in the device shown, state "1" is indicated by a ground voltage and state "0" by a —5 voltage.

Fig. 17 shows the power supply sequence of circuits 201 to 208 vertical lines 12 to 9 show the moments when the successive line punches occur. It can be ascertained either by checking on the figure the moments of passage of the pulses, for the different input combinations, one by one, or by applying the rules of logical calculus in order to establish the existence law of a pulse at the output in function of the input combinations, that to any input code combination correspond one or several pulses at the output during the periods preceding the moment or moments when the corresponding punch or punches are to occur.

Decoder 14 is similar to decoder 11, but its relays are supplied through circuits 211 to 218 supplying the relay corresponding to the one which, in decoder 11, is supplied by the circuit the reference of which differs by ten units. Fig. 18 shows the power supply sequence of said circuits; vertical lines 12 to 9 show the moments when the successive line readings occur (said moments coincide, as a matter of fact, with those corresponding to punching the corresponding lines in the following card). The diagrams of this figure infer from those of Fig. 17 through a displacement about equal to the interval separating two lines; as a matter of fact, the output pulse must be sent no more before but after the passage of the corresponding line.

Pulse distributor

Pulse distributor 12 is shown in Fig. 14e. It is made up of eight groups of ten amplifiers marked Ad0 to Ad10. The input of each group of ten amplifiers is wired to the output of the trigger of the group of ten A chain having a rank corresponding to that of the amplifier. The input of each unit amplifier is wired to the output of a coincidence circuit having one of its inputs wired to the output of the trigger of the "8 unit" chain, the rank of which corresponds to that of the amplifier; the other input of all these coincidence circuits is wired to the output of decoder 11.

At each position of the "group of ten B" chain, the "B unit" chain scans successively the units; the unit amplifiers receive each in turn a pulse on their input circuit if decoder 11 releases a pulse at that moment, i.e., if the signal recorded at that moment in central element 50 corresponds to the digit of the line of the card which is going to be punched.

Output storage

Output storage 13 is shown in Fig. 14e. It is made up of 80 thyratrons with double input marked TH1 to TH80. The inputs of each thyratron are wired, one to the output of the group of ten amplifiers and the other to the output of the unit amplifier the ranks of which correspond to the group of ten and to the thyratron rank unit.

The result is that in order to fire a thyratron it is compulsory and sufficient that, when the B scanning chains pass on the position corresponding to the rank of this thyratron, decoder 11 releases a pulse, i.e., that the signal transferred to this decoder by central element 50 (and proceeding from, as previously stated, storage 7 position scanned at this same moment by the same chains) be expressed in the output code by a hole in the line which is to pass under the punches (and eventually in other lines).

The plate circuit of each thyratron supplies the electromagnet controlling one of the punches of the punching machine; the picking up of said electromagnet has for a result to interpose a pawl between the corresponding punch and the punch control bar. No explanation will be given of the mechanism which is described in above-mentioned U.S. Patent No. 2,603,416.

Reading storage

The reading storage includes, as the other storages, 80 positions but each position comprises only one core instead of seven. Said cores are assembled in 8 groups of ten. Each core is crossed by:

A reading line; there is a reading line per core, each line is wired to one of the check brushes of the punch and the detection of a punch by said brush has for a result to send in the reading line a pulse having a sufficient voltage to switch the corresponding core to "active" state.

A group of ten line and a unit line, similar to those of other storages but used only for reading (knowing that those of the other storages are used for reading or recording); as in other storages, reading is realized by sending onto the group of ten line and the unit line defining the core to be read, currents the effects of which add to switch the core to "neutral" state.

As in the other storages, each unit line receives pulses from one of outputs U1 to U10 of the scanning chains and each group of ten line receives, through a coincidence circuit which is released only by a pulse characterizing the storage, a pulse from one of outputs D0 to D7. The transmitting of said pulses requires, as for the other storages, the presence of a read pulse.

The pulse characterizing the read storage is transmitted by line 46 which, as stated in the switch description, transmits also a pulse either to storage 7 (through line 47), or to storage 8 (through line 48) for the check scanning. Consequently, the read storage is scanned at the same time as the storage to be checked. It should be noted that since no rewriting occurring jointly with said reading, the scanning has for effect to erase the storage, which is consequently ready to record the following line of the card being checked.

The pulses collected on the read line of the read storage are transmitted, through an amplifier not shown, to line 250 which transmits them to temporary recording element 52.

TEMPORARY RECORDING ELEMENT 52

Temporary recording element 52 (Fig. 14c) is made up of a trigger B52 which is started by an advance pulse going through diode gate 251 favored by the pulses transmitted by line 250. It is reset by the following advance pulse, transmitted by diode gate 252 favored by the trigger right output. Said output is wired to comparing device 16.

COMPARING DEVICE

Comparing device 16 (Fig. 14c) compares the pulses from decoder 14 with those from temporary recording element 52. It comprises an "exclusive OR" circuit made up of inverter 116, coincidence circuits 261 and 262 and scramble circuit 263. Circuits 261 and 262 can release a positive pulse only if there is a pulse on circuit 46, i.e., during the check scanning; circuit 261 releases a pulse if it receives at the same time a positive pulse from decoder 14 and a positive pulse from the left output of trigger B52 (indicating the absence of a hole); circuit 262 releases a positive pulse if it receives at the same time a positive pulse from inverter 116 (indicating the absence of a pulse at the output of decoder 14) and a positive pulse from the right output of B52 (indicating the presence of a hole). In both cases, there is a pulse transmitted by scramble circuit 263; said pulse is used as an error signal.

However, this signal is transmitted only if there is a voltage on line 264. Said voltage is eliminated when there is no card under the read brushes of the punch, that is, during the punching of the first card.

The error signal actuates relay 266. This signal may be used for any purpose (stopping the machine, firing a tube, etc.).

V. OPERATION

Two kinds of operations are contemplated:

Transfer into one of storages 7 or 8 used as a "punch storage" of the information contained in storage 5 (or other storages).

Successive scanning operations of said punch storage in order to enter in the output storage before the punching of each line, the information determining the columns to be punched in said line, and successive scanning operations of the check storage in order to send into the comparing device after the reading of each line, the information indicating the data punched in the read line.

The first operation will not be described further here. It is described in copending application No. 704,782, filed Dec. 23, 1957. Only the switching of the storages used as printing storage will be described with the switch operation.

Figure 21:
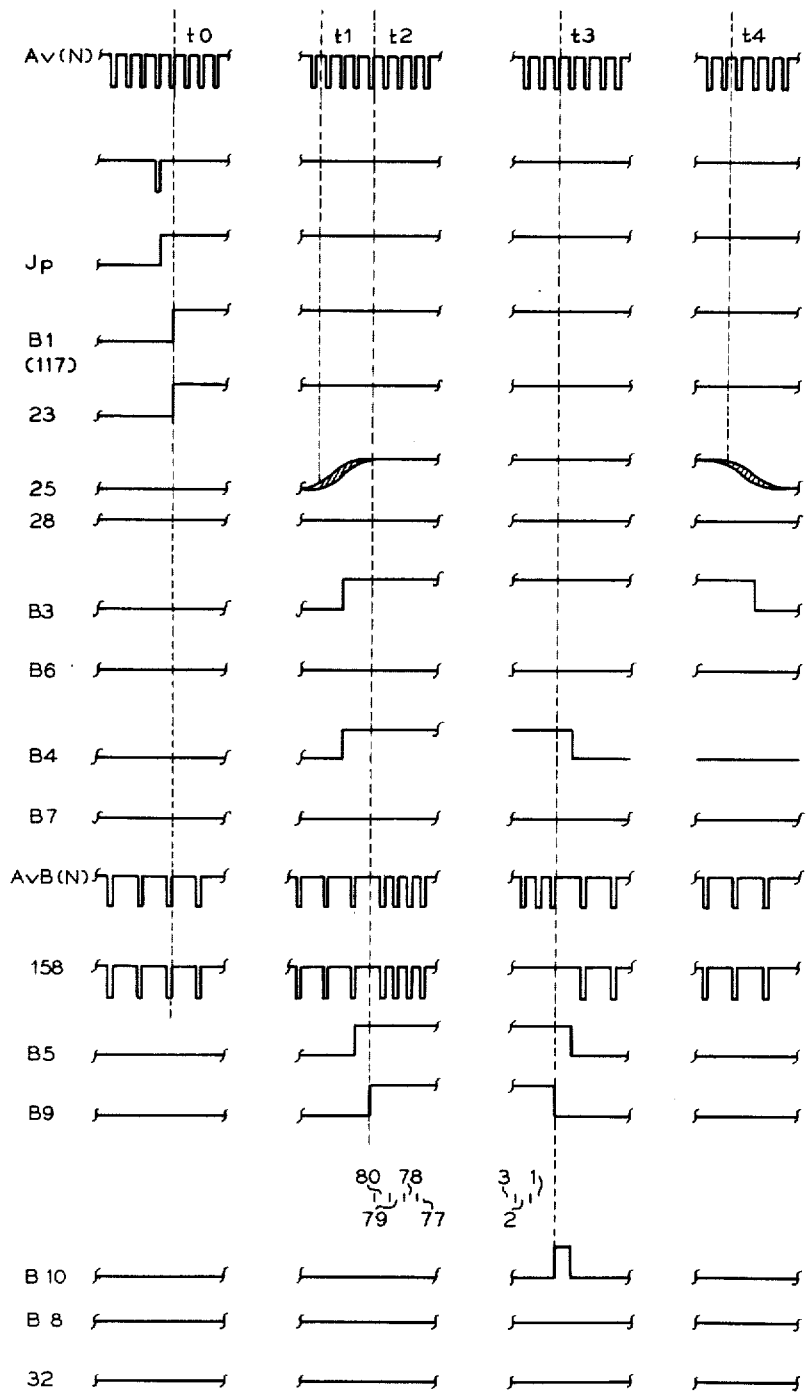
Figure 22:
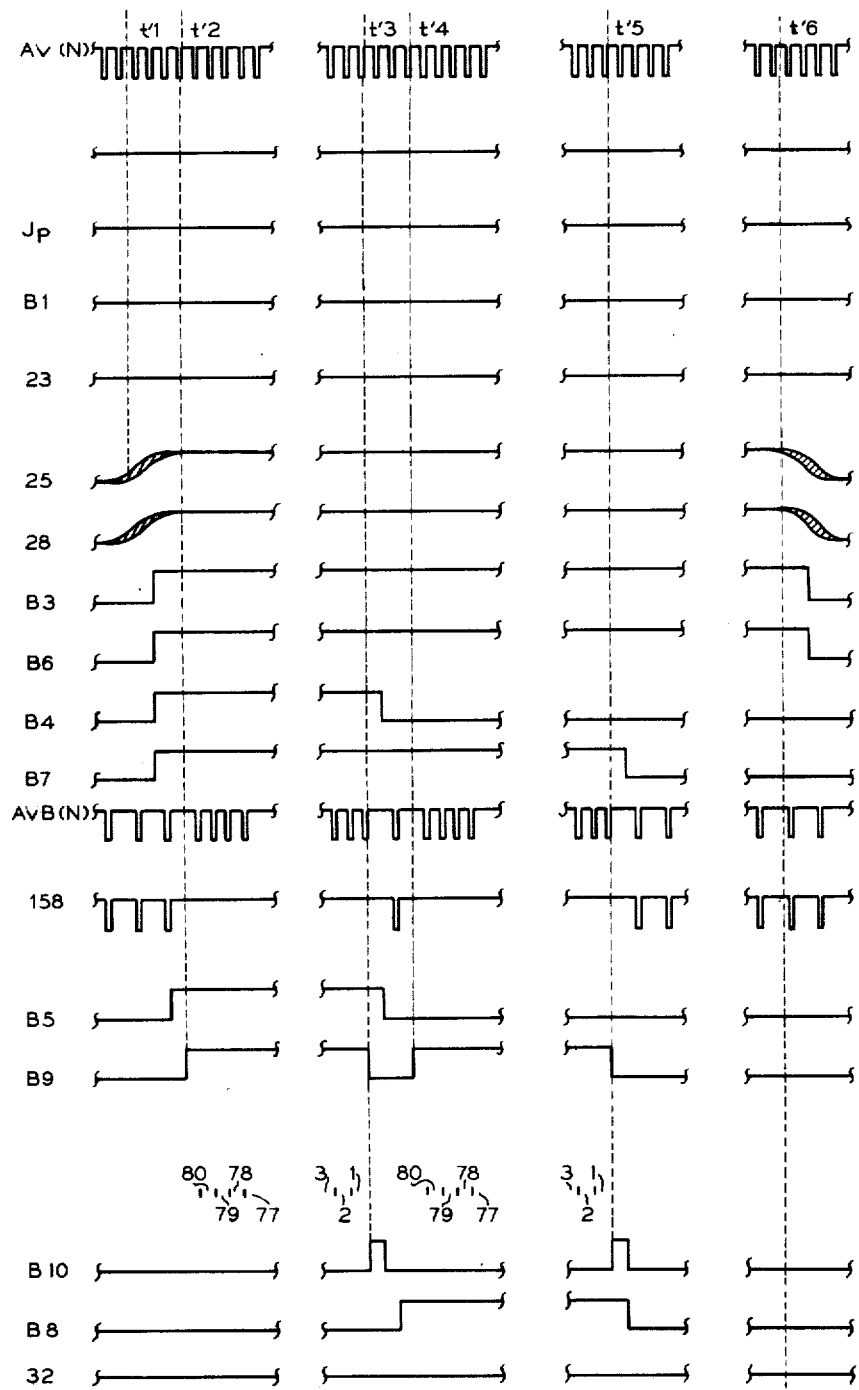
Figure 23:
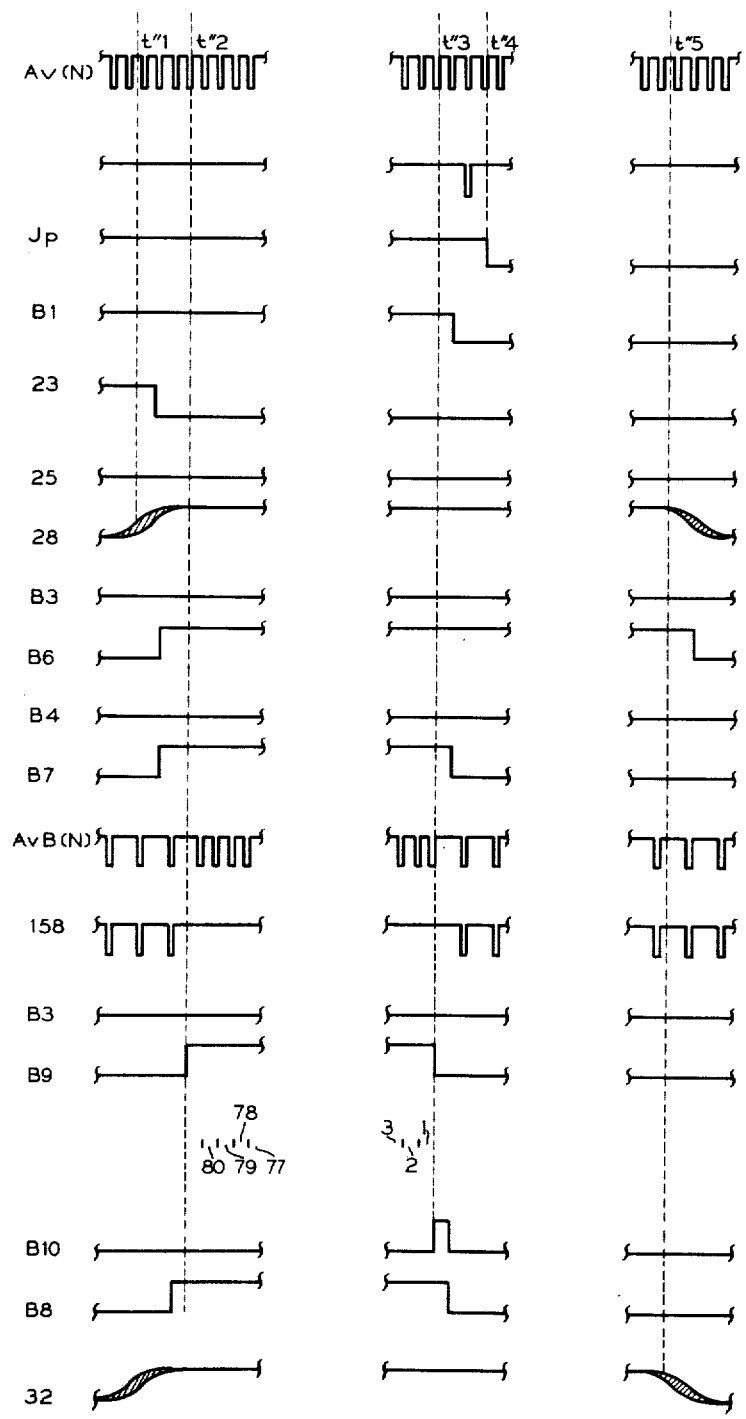

The second operation is illustrated by the chronological diagram of Figs. 21, 22 and 23 (Fig. 22 must be located to the right of Fig. 21 and Fig. 23 to the right of Fig. 22). Said diagram shows the shape of the signals in various points of the program element during a punch cycle (during which a card is fed under the punches while another card is fed under the read brushes). The individual cases of the first and last cards will be explained later.

FEEDING OF A CARD

The first curve Av (N) represents the advance pulses.

The second curve represents the stage change pulse. Said pulse is caused by the end of the stage preceding, in the program, the one during which the punching is to occur; its means of producing the pulse, being out of the object of the invention, will not be explained.

As stated above, the coincidence of this pulse with a positive signal on input hub J'1 (which lasts during the whole preceding stage because it is wired to the output hub of the preceding stage) causes on output hub J'4 and J'5 and, consequently, on operation hub Jp (wired to J'4 through a removable connection) a pulse which will last as long as there will be no stage change pulse.

The pulse on Jp favors output diode gate 118 so that on the following advance pulse trigger B1 switches to operating state (time to) which results (in the absence of pulse 32 which occurs only on the passage of the last line of a card) in sending a pulse to circuit 23 and, consequently, to control in the punching machine the feeding of a card to the punches of said machine and the feeding of the preceding card under the reading brushes.

PREPARATION OF LINE 12 PUNCHING

On time t1 preceding the passage of line 12 of a card under the punches and of another card under the reading brushes the punching machine sends a signal to circuit 25 (but to circuit 28, because there is no line to be checked yet). The rise of this signal is shown by a thick and slant line to indicate that its position in time with respect to the main machine advance pulses is anywhere and that its setting is somewhat slower than that of electronic signals.

The first advance pulse, following the moment when said signal has got a sufficient value, causes, owing to coincidence circuit 130, the switching to operation of trigger B3 and almost immediately that of trigger B4 (switching to operation of B4 is possible because, out of hypothesis, the last card case has not been reached and, consequently, there is a positive voltage on the left output of B2). The following advance pulse B switches B5 to operation. This is possible because circuit 158 can transmit negative pulses when B9 is at rest, as previously stated.

On time $t2$, advance pulse A which follows above-mentioned advance pulse B causes, owing to diode gate 152 favored by the output of B5 and OR circuit 150, switching to operation of trigger B9 (opening of the accelerated scanning gate), and this has for a result, as it was explained in the circuit description, to eliminate the negative pulses on 158 and to double the "advance B" pulses which will coincide with "advance" pulses as long as the gate will stay open.

The switching of B5 to operation has also for a result to locate chains B, on the following advance B pulse, on position 80 (i.e., the "group of ten B" chain on position 7 and the "B" unit chain on position 10). Circuit 21 is of course connected, through "OR" circuits not shown, to the same circuits than those which are used to locate the chains on these same positions through removable connections. Said circuits, which belong to assembly 9, are not shown. They are described and their operation is outlined in the above-mentioned copending application No. 704,780.

Then, the chains progress one position on each "advance B" pulse. During each chain stop, the read pulse causes the passage of the information contained in the corresponding storage position toward central element 50, and the write pulse causes its re-writing in the storage position; the advance pulse which leads the chain to the following position resets the central element triggers. The mechanism of these operations is fully explained in the above-mentioned copending application No. 704,780.

Since the outputs of the chain triggers are wired to the inputs of distributor 12 amplifiers, the amplifiers having their rank corresponding to the chain positions will release an output pulse if decoder 11 releases also such a pulse at the same moment. When a group of ten amplifiers and a unit amplifier release a pulse, the corresponding thyratron in output storage 13 is fired. The operation of decoder 11, of the distributor and of thyratron, storage 13 has been explained in the description of said elements.

When the chains reach the last position (position 1) they release a scanning end pulse as it is explained in the above-mentioned copending application No. 704,780. This pulse transmitted by circuit 31 crosses coincidence circuit 160 (which is not blocked because the punch gate supplied by trigger B1 is open), and favors diode gate 150, so that, on the following advance B pulse, trigger B9 is reset and trigger B10 is switched to operation (time $t3$).

Switching to operation of B10 has for a result to give way to the advance pulses toward line 164 through OR circuit 163 used as a negative coincidence circuit, so that the next advance pulse resets not only B10 (through diode gate 160) but as well B4 and B5 (through line 164 and diode gate 136 favored by the output of B5).

On the contrary, B7, which is still in operation, is not reset since diode gate 146 is not favored.

After time $t7$, the first punch scanning is consequently over and the list of the columns to be punched in line 12 is recorded in output storage 13.

On time $t4$ signal 25 of the punching machine stops: a positive signal appears at the output of inverter 12, which has for a result to favor diode gate 131 and, on the next following pulse, trigger B3 resets.

All the triggers of the program element, excepted B1 are now at rest.

*Punching and reading of line 12*

Then, lines 12 of both cards pass, one in front of the punches, the other in front of the reading brushes; the first card is punched in the columns the punches of which have been prepared by storage 13, and read storage 15 records the second card columns ranks in which there is a "12" punch.

Following this passage, power supply to the thyratrons is temporarily cut off in order to put them off, then it is turned back on (the circuits that control this operation are not shown).

*Preparation of punching line 11 and checking of line 12*

Between the passage of line 12 and that of line 11, two operations are to be performed:

Preparation of line 11 for the first card.
Checking of line 12 for the second card.

These operations are controlled on time $t'1$, one by a new signal 25, the other by a signal 28 (it is assumed that said signals are simultaneous in order to simplify the disposition of cards in the punching machines, but this is not absolutely necessary).

The following advance pulse switches B3 to operation, as previously stated for time $t1$, and through a process similar to B6, also, B4 and B7, owing to the voltage rise at the right outputs of B3 and B6, switch to operation almost immediately. The following pulse switches B5 to operation, but not B8, because diode gate 146 is blocked by the output of B4. Switching to operation of B5 favors gate 152 so that at the next advance A pulse, B9 is switched to operation; that is, the accelerated scanning is again open (time $t'2$).

Between times $t'2$ and $t'3$, the pulses follow each other as in between $t2$ and $t3$; the punch storage is scanned and output storage 13 receives the signals transmitted to distributor 12 and proceeding from decoder 11 having its relays now located to enable it to supply an output signal owing to input signals to which corresponds a hole in the 11 line.

On time $t'3$ as on time $t3$, the chains send a scanning end signal causing the reset of B9, the switching to operation of B10 and, on the following advance pulse, the reset of B4 and B5.

B4 being at rest, diode gate 149 is released and, B7 being still in operation, the following advance B pulse transmitted by OR circuit 157 (negative coincidence circuit that can transmit the advance pulse since B9 is reset) switches B8 to operation, and this has for a result:

To send a pulse to circuit 46, thus giving the possibility to the check storage (storage 8 for the present position of switch 6) to transmit or to receive information.

To send a pulse to diode gate 152, thus switching B9 to operation owing to the following advance A pulse, i.e., opening again the accelerated scanning gate and consequently eliminating the advance A pulses and doubling the advance B pulses.

To send a pulse to line 21 (through OR circuit 151) thus to the following advance B pulse, to locate the B chains on position 80 (time $t'4$).

Then the chains progress in the same manner as between times $t2$ and $t3$, which has for a result to scan check storage 8 and at the same time, as previously stated, read storage 15. Comparing device 16, which receives as previously stated, the information from storage 15, through recording element 52 and the information from storage 8 through central element 50 and decoder 14, detects the possible errors.

On time t'5 the scanning is over, the chains send a signal which as on times t3 and t'3 resets trigger B9, switches trigger B10 to operation and this on the next advance pulse, resets B7 and B8.

On time t'6 signals 25 and 28 of the punching machine are ending, B3 and B6 are reset.

*Punching of line 11*

Lines 11 of the cards pass then under the punches and brushes; those among the columns of the first card's line 11 to be punched and those among the columns of the second card's line 11, which include a hole, switch to active state the corresponding cores of read storage 15.

*Following lines*

Then, the punching machine sends new signals 25 and 28 in order to prepare the punching of line 0 and check line 11, and the same process as previously takes place. The same is true for the following lines until the punching of the last line, i.e., the 9's line.

*Checking of the last line*

When the 9's line has been punched in the first card, the 9's line which has just been read is still to be checked in the second card. Consequently, there is still a scanning of storage 8 to be performed.

On time t"1, which follows the passage of the 9's line (Fig. 14c) the punching machine sends a signal 28 without sending any signal 25. On the contrary, it sends at the same time a signal 32 (card passage end signal), the purpose of which is to be explained.

The check storage scanning takes place as for the preceding lines, excepted that it is not preceded with a punch scanning; consequently, triggers B3, B4 and B5 remain at rest and coincidence circuit 149 is not blocked, so that trigger B8 may switch to operation immediately. The scanning and the checking of possible errors take place from time t"2 to time t"3.

On time t"3, the chain sends (as on times t3, t'3 and t'5) a scanning end signal causing the reset of B9 and the switching to operation of B10. The advance pulse that follows this switching to operation causes (as on time t'5) the reset of B7, B8 and B10 itself. But, moreover, owing to the existence of signal 32, coinciding with the existence of positive pulses on lines 46 and 161, the output of coincidence circuit 120 favors diode gate 119 so that the next advance pulse resets B1 (punch gate closing).

The pulse from coincidence circuit 120 causes also, as previously stated, the switching of switch 6.

SWITCHING TO THE NEXT OPERATION

The reset of B1 causes a rise of voltage on its left output so that coincidence circuit 200 having one of its inputs wired to said left output and the other to hub Jp, still under voltage, releases an output pulse which is used to change the program stage. Said method is described in the above-mentioned copending application No. 704,780. If the punch stage is the last of the program, the stage change pulse, instead of being sent to the input hub of a stage, is sent to program end hub Jf and used to control the feeding of a new card in the main machine.

Trigger B6 is reset by the end of signal 28, but the program of the machine may go on, before B6 is reset.

FIRST CARD CASE

In the first card case, the scanning operations are performed in the same manner as for the others; the check scanning operations are thus performed as the punch scanning, but, no voltage being applied to line 264, there is no error signal at the output of coincidence circuit 265.

LAST CARD CASE

When the last card is punched, it must be checked. Said operation is controlled as soon as the program is over; at this moment, program end hub Jf receives a pulse which is sent to diode gate 113 favored by line 114, owing to a card lever which supplies a voltage to circuit 114, when there is no card in the main machine hopper. Anyway, voltage may be supplied to line 114 in any other manner.

As it was explained in the punch gate description, the pulse transmitted by diode gate 113 switches B2 to operation and this has for a result:

(1) To switch B1 to operation and then, to start signal 23, i.e., a feeding operation in the punching machine; the card which has just been punched is fed under the read brushes, while a new card (which, by the way, will not be punched) is fed under the punches.

(2) To block diode gate 132 so that trigger B4 will not possibly be switched to operation; and consequently, trigger B5 will not be switched to operation during this cycle so that the punch storage will not be scanned and, moreover, coincidence circuit 149 not being blocked by B4, signals 28 sent by the punching machine will start immediately the check scanning operations.

(3) To block coincidence circuit 126 so that no pulse may be transmitted to line 125 and that trigger B11 of the switch not be changed at the end of the cycle.

The checking operation is performed in the same manner as in the other cycles. At the end of the cycle, trigger B2 is reset by the advance pulse immediately following the one which has reset trigger B1.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine, a recording station for recording data on unit records in a first code, a reading station for reading the unit records recorded at said recording station, a source of data to be recorded, a first storage device for storing in a second code data to be recorded on a first unit record in said first code, a second storage device for storing in said second code data to be recorded on a second unit record in said first code, a first translator having an input and an output for translating data manifested in said second code on said input to data manifested in said first code at said output, a second translator having an input and an output for translating data manifested in said second code on the input of said second translator to data manifested in said first code at the output of said second translator, means connecting the output of said first translator to said recording station, a comparing device having first and second inputs and an output for manifesting a signal upon different data simultaneously appearing on said first and said second inputs, means connecting the output of said second translator to said first input, means for transmitting data read from a unit record at said reading station to said second input, switching means for transmitting the data from said first storage device to said first translator when said first unit record is in said recording station and for transmitting the data from said first storage device to said second translator when said first unit record is in said reading station whereby the data from said first storage device recorded on said first unit record at said recording station is compared with the data stored in said first storage device as said first unit record is read at said reading station.

2. In a data processing machine, a recording station for recording data on unit records in a first code, a reading station for reading the unit records recorded at said recording station, a source of data to be recorded, a first storage device for storing in a second code data to be recorded on a first unit record in said first code, a second storage device for storing in said second code data to be recorded on a second unit record in said first code, a first translator having an input and an output for translating data manifested in said second code on said input to data manifested in said first code at said output, a second translator having an input and an output for translating data manifested in said second code on the input of said second translator to data manifested in said first code at the output of said second translator, means connecting the output of said first translator to said recording station, a comparing device having first and second inputs and an output for manifesting a signal upon different data simultaneously appearing on said first and second inputs, means connecting the output of said second translator to said first input, means for transmitting data read from a unit record at said reading station to said second input, and means for alternately connecting said first and said second storage devices to said first and said second translators such that said first storage device is connected to said second translator while said second storage device is connected to said first translator and vice versa so that data fed from a storage device for recording on a unit record is fed from the storage device to said comparing device when the last-mentioned unit record is in said reading station.

3. Apparatus according to claim 2 wherein data to be recorded on unit records is alternately fed to said first and to said second storage devices whereby the operation of said data processing machine is not interrupted in checking the accuracy of the recording.

4. Apparatus according to claim 3 wherein data are serially fed from one of said storage devices through said second translator to said comparing device while data from said source are fed to said one of said storage devices.

5. Apparatus according to claim 4 wherein said recording station comprises a punching mechanism and said reading station comprises means for sensing perforations punched at said recording station.

6. Apparatus according to claim 4 further characterized by the provision of utilization means connected to the output of said comparing device for controlling the operation of said machine upon the occurrence of a signal at said output.

References Cited in the file of this patent

UNITED STATES PATENTS 2,702,380   Brustman _____ Feb. 15, 1955